(12) United States Patent
Bönisch et al.

(10) Patent No.: US 12,380,310 B2
(45) Date of Patent: Aug. 5, 2025

(54) MULTIFUNCTIONAL TAG

(71) Applicant: ETO MAGNETIC GmbH, Stockach (DE)

(72) Inventors: Benjamin Bönisch, Bodman-Ludwigshafen (DE); Tobias Plötzing, Bodman-Ludwigshafen (DE); Walter Naumann, Immenstaad (DE)

(73) Assignee: ETO MAGNETIC GmbH, Stockach (DE)

( * ) Notice: Subject to any disclaimer, the term of this patent is extended or adjusted under 35 U.S.C. 154(b) by 0 days.

(21) Appl. No.: 18/580,358

(22) PCT Filed: Jul. 21, 2022

(86) PCT No.: PCT/EP2022/070439
§ 371 (c)(1),
(2) Date: Jan. 18, 2024

(87) PCT Pub. No.: WO2023/001941
PCT Pub. Date: Jan. 26, 2023

(65) Prior Publication Data
US 2025/0094756 A1    Mar. 20, 2025

(30) Foreign Application Priority Data
Jul. 22, 2021 (DE) .................. 10 2021 118 998.5

(51) Int. Cl.
*G06K 19/07* (2006.01)
(52) U.S. Cl.
CPC ....... *G06K 19/072* (2013.01); *G06K 19/0724* (2013.01)

(58) Field of Classification Search
CPC .................. G06K 19/072; G06K 19/0724
See application file for complete search history.

(56) References Cited

U.S. PATENT DOCUMENTS

| | | | |
|---|---|---|---|
| 8,094,012 B1 * | 1/2012 | Tran | G01S 5/0036 340/572.1 |
| 2005/0174975 A1 * | 8/2005 | Mgrdechian | G06Q 30/0207 370/338 |

(Continued)

FOREIGN PATENT DOCUMENTS

| | | |
|---|---|---|
| CN | 111970639 B | 3/2023 |
| WO | 2020/214708 A1 | 10/2020 |

OTHER PUBLICATIONS

Search Report mailed Apr. 25, 2022 in corresponding German Patent Application No. 10 2021 118 998.5 (and English translation).

(Continued)

*Primary Examiner* — Tuyen K Vo
(74) *Attorney, Agent, or Firm* — Posz Law Group, PLC

(57) ABSTRACT

A multifunctional tag includes one or more first monitoring sensor units and one or more second monitoring sensor units. The first monitoring sensor unit is for the purpose of omnidirectional direction determination with respect to one or more further multifunctional tags. The second monitoring sensor unit is for the purpose of direction-restricted, for example cone of vision-restricted, distance determination with respect to one or more further multifunctional tags.

27 Claims, 10 Drawing Sheets

(56) References Cited

U.S. PATENT DOCUMENTS

| | | | |
|---|---|---|---|
| 2006/0022833 A1* | 2/2006 | Ferguson | A63F 13/212 |
| | | | 340/539.13 |
| 2014/0278688 A1 | 9/2014 | Sullivan et al. | |
| 2018/0137480 A1 | 5/2018 | Houghton, IV et al. | |
| 2020/0092683 A1 | 3/2020 | Fyfe et al. | |
| 2021/0067915 A1* | 3/2021 | Mao | G01S 5/0273 |
| 2021/0070332 A1* | 3/2021 | Hanczor | H04W 4/42 |
| 2021/0303717 A1* | 9/2021 | Neves | G06F 21/32 |

OTHER PUBLICATIONS

International Preliminary Report on Patentability of the International Search Authority mailed Jan. 18, 2024 for the corresponding International Application No. PCT/EP2022/070439 (English Translation Only).

International Search Report of the International Searching Authority mailed Nov. 23, 2022 for the corresponding International Application No. PCT/EP2022/070439 (English Translation Only).

* cited by examiner

MULTIFUNCTIONAL TAG

CROSS-REFERENCE TO RELATED APPLICATIONS

This patent application is a U.S. national stage application of international patent application PCT/EP2022/070439, filed on Jul. 21, 2022, which is based on and claims priority to German patent application DE 10 2021 118 998.5, filed on Jul. 22, 2021, the contents of which are incorporated herein by reference.

PRIOR ART

The invention relates to a multifunctional tag, to a system with a plurality of multifunctional tags which interact with one another and are associated with different mobile objects and/or living beings, and to a method with the system.

Various contact monitoring systems with tags which are associated with individual people, have already been proposed, in particular in connection with the Covid 19 crisis.

The object of the invention consists in particular in providing a generic device with advantageous properties in terms of movement and/or contact analysis. The object is achieved according to the invention.

ADVANTAGES OF THE INVENTION

The invention is based on a multifunctional tag with at least one first monitoring sensor unit and with at least one second monitoring sensor unit.

It is proposed that the first monitoring sensor unit is configured for the purpose of omnidirectional (360°) direction determination with respect to at least one further multifunctional tag which is in particular at least substantially identical to the multifunctional tag, and that the second monitoring sensor unit is configured for the purpose of direction-restricted, in particular cone of vision-restricted, (<360°) distance determination with respect to at least one further multifunctional tag which is in particular at least substantially identical to the multifunctional tag. As a result, a comprehensive evaluation of the surroundings can be achieved which can in particular advantageously contribute to infection protection, to monitoring people (children), objects, and/or pets, to analyzing a stream of visitors, and for many other purposes.

In particular, the "multifunctional tag" is designed as a wearable, i.e. preferably as a computer system, integrated into a piece of clothing or worn (directly) on the body, which registers and processes data relating to a user or their environment. For example, the multifunctional tag can take the form of a pendant, lanyard, pin, sticker or of a device which can be fastened tightly around a body part. In particular, the multifunctional tag is configured for performing a plurality of different functions such as, for example, contact and/or distance monitoring, monitoring children, objects, and/or pets, analyzing a stream of visitors, access control, displaying identity, a payment function, etc. In particular, the first monitoring sensor unit is additionally configured for the purpose of omnidirectional distance determination with respect to the further multifunctional tag. By virtue of the proposed combination of monitoring sensor units, the approach of the further multifunctional tag, which can be associated for example with a potential source of infection, can, for example, be determined before a wearer of the further multifunctional tag enters a vicinity in front of the wearer of the multifunctional tag. A potential source of danger can consequently advantageously already be identified in good time. In particular, the direction-restricted distance determination is restricted to a cone, starting from the second monitoring sensor unit with an opening angle of no more than 170°, preferably no more than 120°, advantageously no more than 90°, particularly preferably no more than 50°, and particularly preferably at least 30°. In particular, in a state fastened properly to a wearer, a cone of vision of the second monitoring sensor unit, in which a distance determination is possible with the second monitoring sensor unit, overlaps at least partially and preferably completely with the field of vision of the wearer of the multifunctional tag. In particular, the first monitoring sensor unit and the second monitoring sensor unit are designed so that they are at least partially separated from each other. In particular, the first monitoring sensor unit and the second monitoring sensor unit are based on different measuring principles. In particular, the first monitoring sensor unit and the second monitoring sensor unit detect physically different types of signals, in particular different types of waves (transverse waves vs. longitudinal waves). "Configured" is in particular to mean specifically programmed, designed, and/or equipped. The fact that an object is configured for a specific function is to be understood in particular that the object fulfils and/or performs this specific function in at least one application and/or operating state.

It is moreover proposed that the first monitoring sensor unit has an ultra-wideband (UWB) transceiver which is configured in particular for distance and direction determination in a vicinity and at long range. As a result, particularly precise direction- and distance-resolved monitoring of further multifunctional tags in the environment can advantageously be enabled which additionally to a certain degree can also advantageously see through barriers. "UWB transceiver" is understood in particular to mean a sensor emitting and receiving electromagnetic waves, in particular wave packets, wherein the emitted electromagnetic waves, in particular the emitted wave packets, and the received wave packets cover a particularly large bandwidth, preferably a bandwidth of more than 500 MHz. In particular, the wave packets emitted and received by the UWB transceiver comprise a plurality of electromagnetic waves of different frequency which preferably have a fixed phase relationship with one another. In particular, the UWB transceiver detects the electromagnetic waves (ultra-wideband signals) emitted by the further multifunctional tags, in particular wave packets, in order to evaluate a position and/or distance of the further multifunctional tags relative to the multifunctional tag. The distance is here determined in particular via measuring the travel time of a UWB signal which is exchanged (back and forth) between in each case two participating multifunctional tags. Herein a direction recognition can be implemented by each of the multifunctional tags featuring a plurality of antennae spaced apart from one another, and a time delay in the arrival of a UWB signal between two or more of these antennae is evaluated. A transmitter and/or a receiver of the UWB transceiver is preferably operated continuously. It is, however, alternatively also conceivable that the transmitter and/or the receiver of the UWB transceiver is operated in an intermittent and/or pulsed fashion. The influencing and/or disruption of other radio transmission processes, in particular other narrow-band radio transmission processes such as, for example, LoRa, 5G, or WLAN (in particular 802.11p), can advantageously be prevented by use of ultra-wideband sensor technology. In particular, the receiver of the UWB transceiver is configured to register and process a plurality of in particular simultaneously received ultra-wideband signals from different multifunctional tags. In this context, a "vicinity" is in particular to mean in particular a region which is formed completely by points which are at a distance of no more than 7 m, preferably no more than 5 m, preferably no more than 3 m, and particularly preferably no more than 2 m from the UWB transceiver. In this connection. "Long range" is in particular to mean in particular a region, in particular within a transmitter range of the multifunctional tags, which is formed completely by points which are at a distance of at least 2 m, preferably at least 3 m, preferably at least 5 m, and particularly preferably at least 7 m from the UWB transceiver. It is conceivable that transmitted together with the ultra-wideband signal is an identifier signal which is separate or integrated into the ultra-wideband signal and allows the respective individual multifunctional tag emitting the identifier signal to be identified by other multifunctional tags.

It is moreover proposed that the second monitoring sensor unit has an ultrasonic transceiver and an EM transceiver for high-frequency electromagnetic waves, which are configured in particular in combination for the purpose of barrier-sensitive vicinity distance determination by obtaining travel time differences of sound waves and electromagnetic waves. As a result, precise vicinity monitoring can advantageously be enabled which is additionally advantageously barrier-sensitive, i.e. can distinguish in particular between direct contacts and contacts which are separated by a barrier, for example a Plexiglas panel. In particular, the second monitoring sensor unit forms a distance determination system, in particular a distance monitoring system, preferably a unidirectional distance monitoring system. In particular, the second monitoring sensor unit, preferably each multifunctional tag, comprises a sound transmitter which is configured to emit an ultrasonic signal. In particular, the second monitoring sensor unit, preferably each multifunctional tag, has an EM transmitter which is configured to emit an electromagnetic signal, in particular an electromagnetic high-frequency signal. It is conceivable that that transmitted together with the electromagnetic high-frequency signal is an identifier signal which is separate or integrated into the electromagnetic high-frequency signal and allows the respective individual multifunctional tag emitting the identifier signal to be identified by other multifunctional tags. In particular, the second monitoring sensor unit, preferably each multifunctional tag, has a sound receiver which is configured to receive the ultrasonic signal of further multifunctional tags. In particular, the second monitoring sensor unit, preferably each multifunctional tag, has an EM receiver which is configured to receive the electromagnetic signal, in particular the high-frequency signal of further multifunctional tags. A distance between the multifunctional tag and the further multifunctional tag can preferably be determined on the basis of the travel time differences between the ultrasonic signal, received by the sound receiver, of a further multifunctional tag and the electromagnetic signal, received by the EM receiver and associated with the received ultrasonic signal, of the further multifunctional tag. It is advantageously particularly simple to measure the travel time difference by the use of signals with essentially different signal speeds (ultrasonic signal: speed of sound in air, i.e. approximately 343 m/s; electromagnetic signal: speed of light, i.e. at approximately $3*10^8$ m/s virtually instantly). The measurement of this travel time difference can advantageously be carried out particularly simply in particular electronically, in particular compared with a measurement of a travel time difference of two signals propagated at the speed of light or of reflected signals at the speed of light. Advantageously, no handshaking between the multifunctional tags is required at least for the distance determination by means of the second monitoring sensor unit. By virtue of the use of ultrasonic signals with a range limited to a few meters, the direct distance determination is advantageously restricted systemically to sources which are arranged in the vicinity of a few meters relative to one another.

In particular, the high-frequency signal has one or more frequencies within the frequency band referred to by the term "high frequency". For example, the high-frequency signal can have one or more frequencies within the short-wave, ultra short-wave, decimeter-wave, centimeter-wave, and/or millimeter-wave range. The high-frequency signal preferably has one or more frequencies higher than 9 kHz. The high-frequency signal preferably has one or more frequencies below 0.3 THz. The high-frequency signal preferably has one or more frequencies in ISM (Industrial, Scientific, and Medical) bands with a general assignment. In this case, the licensing cost is advantageously low. Usual frequency ranges from the ISM bands in this case are in particular 434 MHz, 869 MHz, and 2.4 GHz. It is, however, alternatively conceivable that, in particular for specific applications, the signal of the electromagnetic waves has one or more frequencies outside the frequency band referred to by the term "high frequency", for example one or more frequencies in the long-wave or medium-wave range, one or more frequencies in the infrared light range, or one or more frequencies in or beyond the visible light range.

In particular, the ultrasonic signal has one or more sound frequencies beyond, preferably above, preferably just above (near ultrasound), human hearing. The ultrasonic signal preferably has one or more sound frequencies of more than 15 KHz. The ultrasonic signal preferably has one or more sound frequencies of below 1 GHz. The ultrasonic signal particularly preferably has sound frequencies in the region of approximately 40 KHz.

In general, it is also conceivable, in particular to perform some of the methods and/or applications described below, that the multifunctional has only the first monitoring sensor unit and/or is designed without the second monitoring sensor unit which is based on the travel time difference measurement and/or the ultrasonic signal.

It is additionally proposed that the multifunctional tag has an inertial measurement unit. As a result, an orientation and/or a movement state of the multifunctional tag can advantageously be determined. The data from the inertial measurement unit can advantageously be included in an analysis of the surroundings of the multifunctional tag. In particular, the inertial measurement unit is configured for the purpose of identifying at least three, preferably six, kinematic degrees of freedom.

It is furthermore proposed that the multifunctional tag has an integrated display screen which is configured to show data and/or evaluations from at least one sensor of the multifunctional tag. As a result, a high degree of user-friendliness and/or versatile use can advantageously be achieved. The display screen is preferably a color display screen. The display screen preferably has a resolution of at least 150×150 pixels, preferably of at least 300×300 pixels. In particular, the display screen is designed as a touchscreen. Alternatively or additionally, the display screen is configured to form an ID display, i.e. for example a digital batch (conference batch, trade fair batch, company ID, etc.). For example, in this case the multifunctional tag can be configured for the exchange of contact data of the wearer of the multifunctional tag with a further wearer of a further multifunctional tag. The contact data is, for example, transferred wirelessly between the two multifunctional tags, wherein the authenticity of the transmitted contact data can be ensured via digital certificates and/or via digital identities which are represented by so-called decentralized identifiers (DIDs).

If the display screen covers at least a large portion of a surface of one side of the multifunctional tag on which the display screen is arranged, a high degree of user-friendliness and/or versatility can advantageously be achieved.

It is furthermore proposed that the multifunctional tag has a fastening device which is configured to fasten the multifunctional tag on a mobile object or on a living being, in particular on a person or an animal. As a result, a high degree of user-friendliness can advantageously be achieved. The multifunctional tag is advantageously attached to the wearer in such a way that the field of view of the second monitoring sensor overlaps a line of sight of the wearer at least partially. The fastening device can take the form of an eyelet or tab for receiving a fastening strap, of a pin-type element, for example similar to a safety pin, of a magnetic element, of an adhesive element, etc.

If the multifunctional tag has a casing externally bordering the multifunctional tag and with external dimensions which are smaller than 10 cm×10 cm×3 cm, preferably smaller than 7 cm×7 cm×2 cm, a high degree of wearing comfort can advantageously be achieved.

If moreover the casing externally bordering the multifunctional tag is designed so that it is free of plug connections, a high degree of durability can advantageously be achieved. The casing can advantageously be hermetically sealed as a result. In particular, the casing is at least splashproof and/or rainproof, preferably waterproof. In particular, the casing can consequently be disinfected simply and/or comfortably.

In addition, it is proposed that the multifunctional tag has a wireless energy supply interface. As a result, a high degree of user comfort can advantageously be achieved. In particular, the wireless energy supply interface is designed as an inductive charging interface. In particular, the multifunctional tag comprises a rechargeable battery which can preferably be supplied with charging energy by means of the wireless energy supply interface.

It is furthermore proposed that the multifunctional tag has a wireless communication interface. A high degree of user comfort can be achieved as a result. In particular, the wireless communication interface comprises a Bluetooth interface, a Bluetooth low-energy interface, a WLAN interface, an NFC interface, a ZigBee interface, a LoRaWAN interface, an RFID interface, or a further suitable communication interface.

It is, however, preferably proposed that the communication interface and the energy supply interface are designed integrally with each other, wherein in particular data transmission at the communication interface and energy transmission at the energy supply interface take place via the same magnetic alternating field. As a result, complexity and in particular costs can advantageously be reduced. In particular, for data transmission from a charging unit/tray to the multifunctional tag, the magnetic alternating field generated by the charging unit/tray is modulated in such a way that a data flow between the multifunctional tag and the charging unit/tray can be generated as a result. In particular, in order to transmit data from the multifunctional tag to the charging unit/tray, a load on the side of the multifunctional tag is modulated in such a way that a data flow between the multifunctional tag and the charging unit/tray can be generated. In particular, the signal of the inductive energy supply is thus used additionally also for the transmission of data to and from the multifunctional tag. As a result, it is advantageously possible to dispense with a further wireless communication interface.

Alternatively or additionally, it is proposed that the wireless communication interface comprises a wireless payment interface, a radio key interface, and/or a wireless identification interface. A high degree of user friendliness and/or a high degree of versatility can advantageously be achieved as a result. The wireless payment interface comprises in particular a Near Field Communication (NFC) interface, a Bluetooth interface, or the like. The wireless payment interface is in particular linked to at least one cyberwallet, to at least one crypto wallet, and/or to an account of a mobile payment provider such as Apple Pay, Google Pay, Huawei Pay, boon., Samsung Pay, Alipay, WeChat Pay, Paypal, or the like. Alternatively or additionally, it is conceivable that the wireless payment interface is implemented in the form of a (prepaid or postpaid) credit card. The wireless radio key interface is configured in particular for different possible uses in the field of time recording, access control, or the like. In particular, the radio key interface comprises an RFID chip or an NFC chip for interaction with external access limitation systems. The wireless identification interface is in particular configured to emit a unique identifier which can be associated with a wearer of the multifunctional tag.

It is further proposed that the multifunctional tag has a vibration signal transmitter. A high degree of user friendliness and/or a high degree of versatility can advantageously be achieved as a result. A virtually noiseless alarm and/or alert signal can, for example, advantageously be generated. In particular, a signal generated by the vibration signal transmitter is versatile and can be used, for example, for a distance warning and/or an event warning such as, for example, a notification that an ordered product is ready for collection.

A system is moreover proposed with a plurality of multifunctional tags which interact with one another and are associated with in each case different mobile objects and/or living beings. Comprehensive evaluation of the environment can advantageously be achieved as a result which can contribute in particular advantageously to protection from infection, to monitoring people (children), objects, and/or pets, to analyzing a stream of visitors, and for many other purposes. In particular, the first monitoring sensor unit of the multifunctional tag communicates with all the first monitoring sensor units of further multifunctional tags which are arranged within a maximum range of the first monitoring sensor unit of the multifunctional tag. In particular, the second monitoring sensor unit of the multifunctional tag communicates with all the second monitoring sensor units of further multifunctional tags which are arranged within a maximum range of the second monitoring sensor unit of the multifunctional tag. In particular, each multifunctional tag knows at least the distances and/or directions, preferably positions, of all the further multifunctional tags which are situated within the range of the first monitoring sensor unit and/or the second monitoring sensor unit.

If the system additionally has at least one immovably mounted anchor station comprising at least the first monitoring sensor unit which is configured for the purpose of omnidirectional distance and direction determination with respect to at least one multifunctional tag, the movement of wearers of movable multifunctional tags can advantageously be monitored, followed, and/or stored. The monitoring of sites, rooms, halls, or the like can advantageously be enabled as a result. Analysis of a stream of visitors to premises, rooms, halls, or the like can advantageously be enabled as a result. In general, the anchor station could also be formed by a multifunctional tag fastened in a fixed position at one location.

It is in particular conceivable that the multifunctional tags exchange data with the anchor stations. In particular, the anchor station can be configured to transmit information and/or instructions to the multifunctional tags, in particular to selected multifunctional tags, which are then displayed on the screens of the multifunctional tags. For example, the anchor station can inform some of the multifunctional tags within an area that the area is overcrowded and request that they leave the area. For example, the anchor station can display to all new arriving multifunctional tags an estimated waiting time at a certain area, for example at an amusement park attraction. In particular, the multifunctional tags can be configured to transmit information to the anchor stations, for example multifunctional tag IDs. In particular, data can be transmitted between an anchor station and multifunctional tags by means of the UWB signal, by means of the HF signal, or by means of a further wireless signal which is different from the direction and/or distance measurement signals of the multifunctional tag.

If moreover at least one anchor station is designed as a charging tray for multifunctional tags, the number of different components of the system can advantageously be minimized. In particular, the charging tray is configured for wirelessly supplying energy to the multifunctional tag, in particular to the rechargeable battery of the multifunctional tag.

A method using the system is moreover proposed. In the method, an in particular visual, acoustic, and/or mechanical (vibrational) distance warning signal is generated in at least one method step when the distance between two multifunctional tags falls below a predeterminable minimum distance and/or when said distance exceeds a predeterminable maximum distance. Issuing an alert when the distance falls below a minimum distance can make an advantageous contribution to protection against infection. Issuing an alert when a maximum distance is exceeded can advantageously ensure that people (children), for example in crowds, objects, and/or pets become lost. In particular, a minimum distance range and/or a maximum distance range can be specified for each multifunctional tag. In particular, the minimum distance range and/or a maximum distance range moves with the multifunctional tag. Alternatively, range limits of the minimum distance range and/or a maximum distance range can be fixed in space (keyword: "geofence").

It is additionally proposed that the distance warning signal comprises a directional display which shows in which spatial direction the distance has fallen below the minimum distance and/or has exceeded the maximum distance. Assistance in taking countermeasures, for example in looking for the child, object, and/or pet or in avoiding the risk of contact, can advantageously be provided as a result. It is in particular conceivable that at least one advance-warning minimum distance which is greater than the minimum distance and/or one advance-warning maximum distance which is less than the maximum distance can be set in the multifunctional tags. Advance-warning of the maximum distance imminently being exceeded or the distance imminently falling below a minimum distance can advantageously be signaled as a result (for example, a visual advance-warning signal and an acoustic warning signal).

It is moreover proposed that generation of the distance warning signal and/or a type of distance warning signal depends on whether, when it is recorded that the distance has fallen below a minimum distance, a direct barrier-free contact is detected or whether a barrier-protected contact, for example a Plexiglas panel, is detected. Particularly useful and reliable distance monitoring for protection against infection can advantageously be achieved as a result. The probability of infection in the case of risky contacts can advantageously be assessed particularly well. In particular, the ultrasonic signals of the first monitoring sensor unit do not penetrate through barriers such as, for example, Plexiglas panels, whereas the ultra-wideband signal of the second monitoring sensor passes through these same barriers. It is thus possible to determine, by comparing the signals received by a multifunctional tag, whether the approach of two multifunctional tags to each other was separated by a barrier or not.

It is furthermore proposed that, by monitoring the maximum distance, the in particular undesired moving away of mobile objects, for example bicycles, valuables, etc., and/or living beings, for example children, pets, etc., is detected. A high degree of safety, in particular with respect to pets or children getting lost, and/or to prevent the theft of movable items can advantageously be achieved as a result. In particular, the further multifunctional tag is here fastened to the person, the animal, or the object. The multifunctional tag, in particular the second monitoring sensor unit, then preferably regularly measures the distance from the further multifunctional tag. Movement of the further multifunctional tag away from the multifunctional tag can be shown on the display screen and the exceeding of an in particular settable maximum distance triggers the distance warning signal.

If, in at least one method step, a proposal of a direction and/or route to follow to find the object and/or the living being is made and is in particular displayed to a wearer of a multifunctional tag via the display screen of the multifunctional tag, a high degree of safety, in particular with respect to pets or children getting lost, and/or to prevent the theft of movable items can advantageously be achieved as a result. In particular, it is conceivable here that the direction is displayed in the form of a picture of an arrow or a compass. In particular, it is conceivable here that the route to follow is displayed in the form of a picture of a map. Alternatively or additionally, it is also conceivable that a description of the route is given by speech output.

It is furthermore proposed that in at least one method step, the number of active multifunctional tags within the system, in particular within a predetermined and/or confined region such as, for example, an amusement park, a trade fair site, a festival site, or the like is obtained, for example, by anchor stations distributed in the predetermined and/or bounded region. A comprehensive evaluation of the surroundings can advantageously be achieved as a result.

It is moreover proposed that in at least one method step, a density distribution of active multifunctional tags within the system, in particular within the predetermined and/or confined area such as, for example, the amusement park, the trade fair site, the festival site, or the like is obtained, for example, by anchor stations distributed in the predetermined and/or bounded region. A comprehensive evaluation of the environment can advantageously be achieved as a result.

It is additionally proposed that in at least one method step, flows of active multifunctional tags within the system, in particular within the predetermined and/or confined area such as, for example, the amusement park, the trade fair site, the festival site, or the like is determined, for example, by anchor stations distributed in the predetermined and/or bounded region. Analysis of a stream of visitors and/or guiding of visitors can advantageously be enabled as a result.

It is moreover proposed that in at least one method step, a respective determined number, a respective determined flow, and/or a respective determined density are associated with different target regions arranged apart from one another, for example individual trade fair halls, individual seminar rooms, individual amusement park attractions, etc. within the area, for example a trade fair, a university, an amusement park, etc. A comprehensive evaluation of the environment with intelligent guiding of a stream of visitors can advantageously be enabled as a result, which can offer in particular advantageous properties in terms of reduced waiting times, risks of infection, etc.

It is additionally proposed that in at least one method step, based on the determined number, the determined flows, and/or the determined density for at least one target region, a target region parameter (a target region parameter/a parameter assigned to the target region), for example a waiting time, a capacity utilization, a visitor trend, etc. is determined and is in particular displayed to a wearer of a multifunctional tag. Intelligent guiding of a stream of visitors can advantageously be achieved as a result.

It is furthermore proposed that in at least one method step, a proposal is made for a route to follow which is optimized with regard to the determined target region parameter, for example the waiting time, the capacity utilization, the visitor trend, etc., for example avoids waiting time, and/or avoids crowds, and in particular is displayed to the wearer of a multifunctional tag via its display screen. Intelligent guiding of a stream of visitors can advantageously be achieved as a result. In particular, the system can react dynamically to streams of visitors which are developing. If, for example, a relatively large number of multifunctional tags head toward a target region which is shown to be temporarily particularly favorable in terms of the target region parameter, this newly forming stream of visitors is registered by the system such that the target region parameter of the target region appears as less interesting for further wearers of multifunctional tags who come later because of the effects of the newly forming stream of visitors, and thus fewer people join this stream of visitors which previously appeared to be still favorable and instead turn toward other target regions.

In addition, it is proposed that in at least one method step, a multifunctional tag flow analysis, in particular an analysis of a stream of visitors, and/or a multifunctional tag flow prediction, in particular a prediction of the stream of visitors, is made by an anchor station associated with a target region on the basis of a progression over time of the determined numbers, flows, and/or densities of multifunctional tags. Intelligent guiding of a stream of visitors can advantageously be achieved as a result. The multifunctional tag flow analysis comprises, for example, the development over time, for example changing over the course of the day, of streams of visitors to or from specific target regions. The multifunctional tag flow prediction is based, for example, on previously obtained multifunctional tag flow analyses and is intended to estimate a development of a stream of visitors to a target region, for example to predict an increase or a decrease in the near future, for example in the next 30 minutes. Based on the multifunctional tag flow prediction, a proposal can be made to the wearers of multifunctional tags via the display screen about target regions which are anticipated to soon be favorable in terms of the target region parameter.

It is moreover proposed that in at least one method step, an attention parameter, for example a viewing time, of a wearer of a multifunctional tag relative to an object associated with an anchor station of the system is determined. Advantageous controlling of the stream of visitors can be achieved in particular. The object can take the form of, for example, an advertising surface (for example, a billboard, screen, display window, etc.), of an event site (for example, a stage, playing field, etc.), or of a different type of attraction (for example, a work of art, amusement park ride, etc.). For example, the attention parameter is determined on the basis of a length of time, registered by the system (multifunctional tag of the wearer and anchor station of the object), that the multifunctional tag stays in the vicinity of the object, in particular in conjunction with an orientation, registered by the system, of the wearer relative to the object. It is in particular conceivable that the second monitoring sensor unit is here used to determine the lack of a barrier in the line of vision from the wearer to the object. In particular, the corresponding anchor station is arranged in the vicinity of the object, for example immediately next to, in front of, or behind the object, or on the object. In particular, it is conceivable that the attention parameter is correlated with an activity associated with the object, for example with an artist currently performing on the stage, or with an advertising film currently playing on a screen. In particular, the anchor station and/or the multifunctional tag stores information about who has watched the object and for how long and what activity has taken place during this time on or at the object.

It is moreover proposed that, depending on the determined attention parameter, a transaction is triggered, in particular a data transfer to the multifunctional tag or to a further device, for example a smartphone, of a wearer of the multifunctional tag, a data transfer to the anchor station, for example of contact data of the wearer of the multifunctional tag, etc., and/or an electronic payment procedure, in particular in a fiat currency or in a cryptocurrency, preferably a cryptocurrency with no transaction costs such as, for example, IOTA. An incentive-based control of a stream of visitors can advantageously be enabled as a result. In addition, it is, for example, conceivable that an entrance fee to an area, for example to an event site, can be apportioned to target regions within the area, in particular to operators of target regions within the area, depending on the attention which the visitors pay target regions.

If the transaction is made directly between the anchor station and the respective multifunctional tag and/or between the anchor station and the cyberwallets and/or crypto wallets associated in each case with the multifunctional tag, direct active controlling of the stream of visitors can advantageously be achieved, in particular because effects of a certain behavior, for example viewing an advertising film, can be registered immediately. In particular, it is conceivable that an active account status is displayed live to the wearer of the multifunctional tag on the display screen.

It is moreover proposed that when a distance falls below a specifiable minimum distance between a multifunctional tag associated with a wearer and the immovably mounted anchor station or when a geo region which is specified by one or several anchor stations but does not need to include an anchor station itself is entered, a data transfer from the anchor station to the multifunctional tag is initiated automatically by a wearer of a multifunctional tag, in particular via the wireless communication interface, from the anchor station to the multifunctional tag, wherein in particular the data transmitted in the automatically initiated data transfer is shown automatically on a display screen of the multifunctional tag. Targeted transmission of information, which is in addition particularly user-friendly for the wearer of the multifunctional tag, can advantageously be achieved as a result. In particular, a (advertising) message, (advertising)

image, (advertising) video, user surface, or the like which is received by the anchor station is automatically displayed on each multifunctional tag which moves into the area around the anchor station or around the geo region which is bounded by the minimum distance. Alternatively or additionally, each multifunctional tag which moves into the region around the anchor station or around the geo region which is bounded by the minimum distance receives data from the anchor station which is stored on the multifunctional tag. This data can include, for example, documents about a target region with which the anchor station is associated. For example, the data can take the form of an advertising brochure, a document with contact data (digital visiting card), a digital proof of attendance, a site map, a program of events, background information on an object (work of art/exhibit) with which the anchor station is associated, etc. In particular in the case that advertising material is displayed automatically, it is conceivable that the automatic displaying on the display screen of the multifunctional tag is for a limited time. In particular, the advertising surface can be reserved for a precise time. In addition, it is conceivable that the wearer of the multifunctional tag or an operator of the system with the multifunctional tags is remunerated for the displaying of advertising material. In particular, monetary compensation, in particular a micropayment in a cryptocurrency such as, for example, IOTA is transmitted from the anchor station or from a system linked to the anchor station to the wearer of the multifunctional tag or to an account linked to the multifunctional tag, in particular a crypto wallet. The wireless payment interface can, for example, be used for this purpose. In particular, the length of time of the display and/or the amount of the monetary compensation depends on a period of time during which the multifunctional tag has remained within the minimum distance (for example, within a 10 m perimeter of a trade fair stand). This principle can be applied, for example, to trade fairs but functions in principle anywhere, for example also in a museum or at an event, etc. In general, a region within which the data transfer is initiated can also be a geofence region which is specified by anchor stations and has no anchor stations itself. In particular a radius can be formed with an anchor station, whilst 2D spatial geometries such as polygons, etc. can also be formed with geofence areas.

Furthermore, an additional further method is proposed which can be performed by means of one or more multifunctional tags but which can alternatively also be performed with tags which only feature a display screen and a wireless communication interface. In the further additional method, wearers of the tags, in particular multifunctional tags, are filmed and streamed over the internet. The wearers of the tags, in particular multifunctional tags, can, for example, be sportspeople, preferably e-sportspeople, gamers, or influencers. The wearers of the tags, in particular multifunctional tags, are filmed such that the display screen of the respective tag, in particular multifunctional tag, can be identified in the transmitted video stream. In the further additional method, a digital identity, preferably a decentralized identity (DID), of the wearer is associated with each tag, in particular multifunctional tag. The digital identity, preferably the decentralized identity (DID), is preferably additionally linked to an (internet) alias of the wearer. In the further additional method, a third party, for example an advertising company, can transmit data, for example advertising images or videos, to the tags which is then shown automatically on the display screen of the tags. For this purpose, the data to be displayed and the digital identities of the selected wearers of tags are first selected by the third party in a method step. In a further method step, the data to be displayed and an amount of money, preferably in a cryptocurrency (with no transaction costs) such as, for example, IOTA are transmitted to the tags selected in each case. In at least one further method step, the transmitted data is shown on the display screens of the selected tags. In particular, the length of time for which the data is shown depends on the of the amount of money transmitted. In this way, the third party advantageously rents advertising time for a certain period of time via smart contracts. By virtue of the proposed method, a flexible and particularly simple method for transmitting and presenting data, in particular advertising data, can advantageously be enabled. Advantageously, no direct contact between the advertiser and the sportsperson, gamer, or influencer is necessary.

For example, a gamer who is generally known by an alias and not their real name, films themselves with a webcam when playing a computer game (e-sports, Minecraft, etc.) so that the tag can be seen in the webcam image. The gamer, tag, and alias are linked via a decentralized identity (DID). Now if, for example, a company would like to advertise on a tag of a gamer who, for example, currently has a particularly large number of followers/watchers, it is almost impossible for the company to form a contractual connection with the gamer in the short term. In theory, although the company could chat with each individual gamer in whom they are interested as an endorser, a very great deal of effort would be required. With the method proposed, while the gamer is playing, the company can look for the tags on which advertising is to be placed (players who are currently performing particularly well or who have a particularly large number of watchers). The company would then reserve the corresponding tags for certain periods of time via the DIDs and thus pay the corresponding fees to the wearers of the tags without needing to know them.

In particular, in this case the second monitoring sensor unit detects whether the multifunctional tag of the wearer, in particular the gamer, is not concealed (for example, by clothing or the like) and/or whether the multifunctional tag of the wearer, in particular the gamer, is worn the right way round (with the display screen to the front). The ultrasonic signal of the second monitoring sensor unit is preferably used for this purpose. For example, an anchor station can be arranged in the vicinity of a webcam of the gamer or integrated into a webcam of the gamer which receives and/or evaluates ultrasonic signals of the multifunctional tag of the wearer, in particular the gamer. Alternatively or additionally, it is proposed that the multifunctional tag, in particular in the case of an embodiment of the multifunctional tag with no second monitoring sensor unit and/or with no ultrasound transmitter, has a concealment sensor which is configured to detect concealment of the display screen of the multifunctional tag and/or of the second monitoring sensor unit of the multifunctional tag, for example by means of measuring a brightness. Reliable operation can advantageously be ensured as a result. The concealment sensor is preferably configured to identify that the display screen of the multifunctional tag is concealed by an object or by it being worn the wrong way round. For example, the concealment sensor can take the form of a brightness sensor (for example, a photodiode/photoresistor). In particular, the brightness sensor can be designed as integrated into the display screen. The brightness sensor is preferably arranged behind a display panel (glass, film, LCD, OLED, etc.) and measures, in particular through the display panel, the brightness on the opposite (outer) side of the display panel. In particular, only time in which the multifunctional tag is worn the right way round is registered as advertising time (which incurs a fee).

The multifunctional tag according to the invention, the system according to the invention, and the method according to the invention are here limited to the above-described application and embodiment. In particular, the multifunctional tag according to the invention, the system according to the invention, and the method according to the invention can have a different number of individual method steps, elements, components, and units than that mentioned herein in order to fulfill a function described herein.

DRAWINGS

Further advantages can be found in the following description of the drawings. Exemplary embodiments of the invention are illustrated in the drawings. The drawings, the description, and the claims contain numerous features in combination. A person skilled in the art will be able to expediently also consider the features individually and bring them together in meaningful further combinations.

Figure 3:
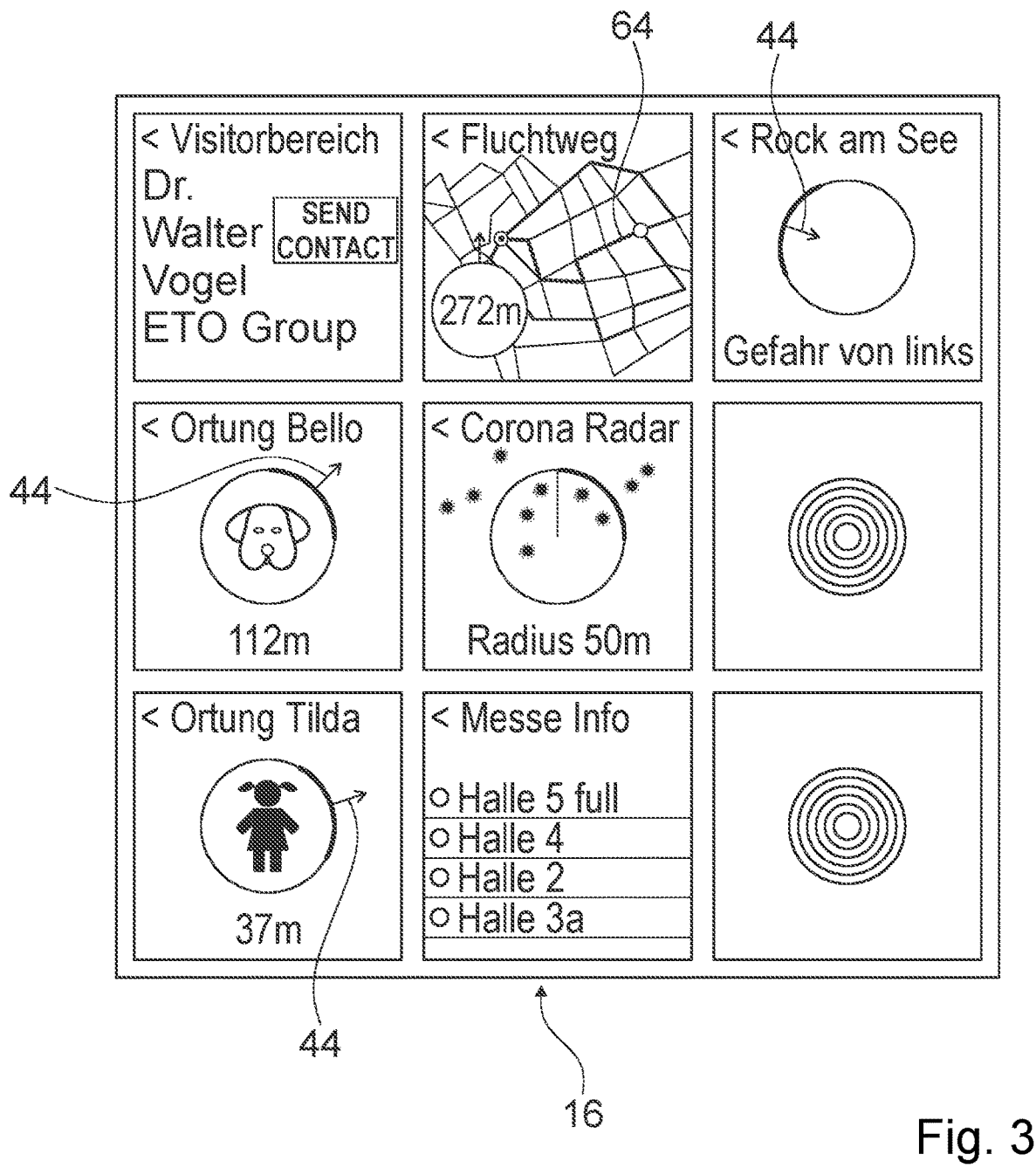
Figure 4:
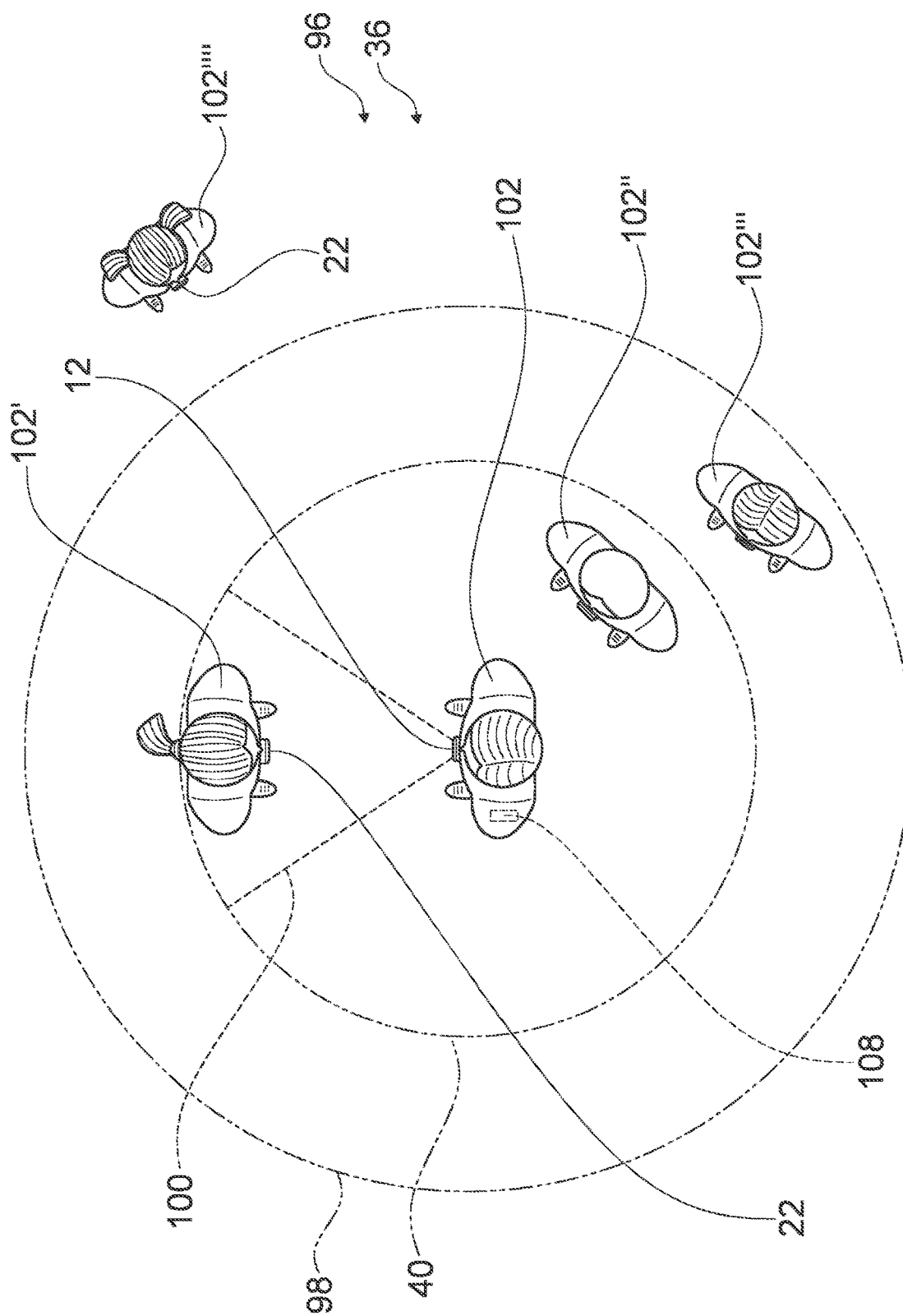
Figure 5:
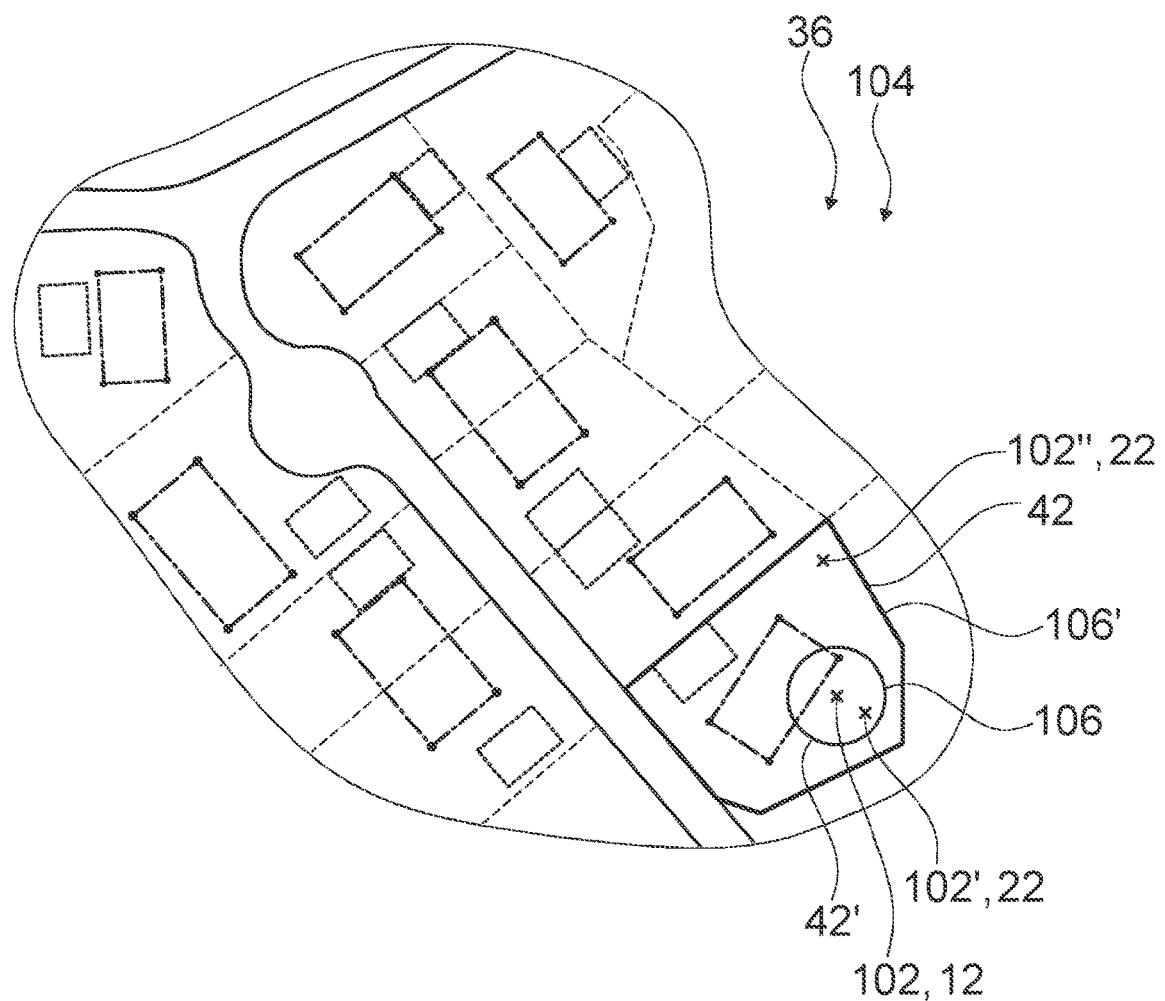
Figure 6:
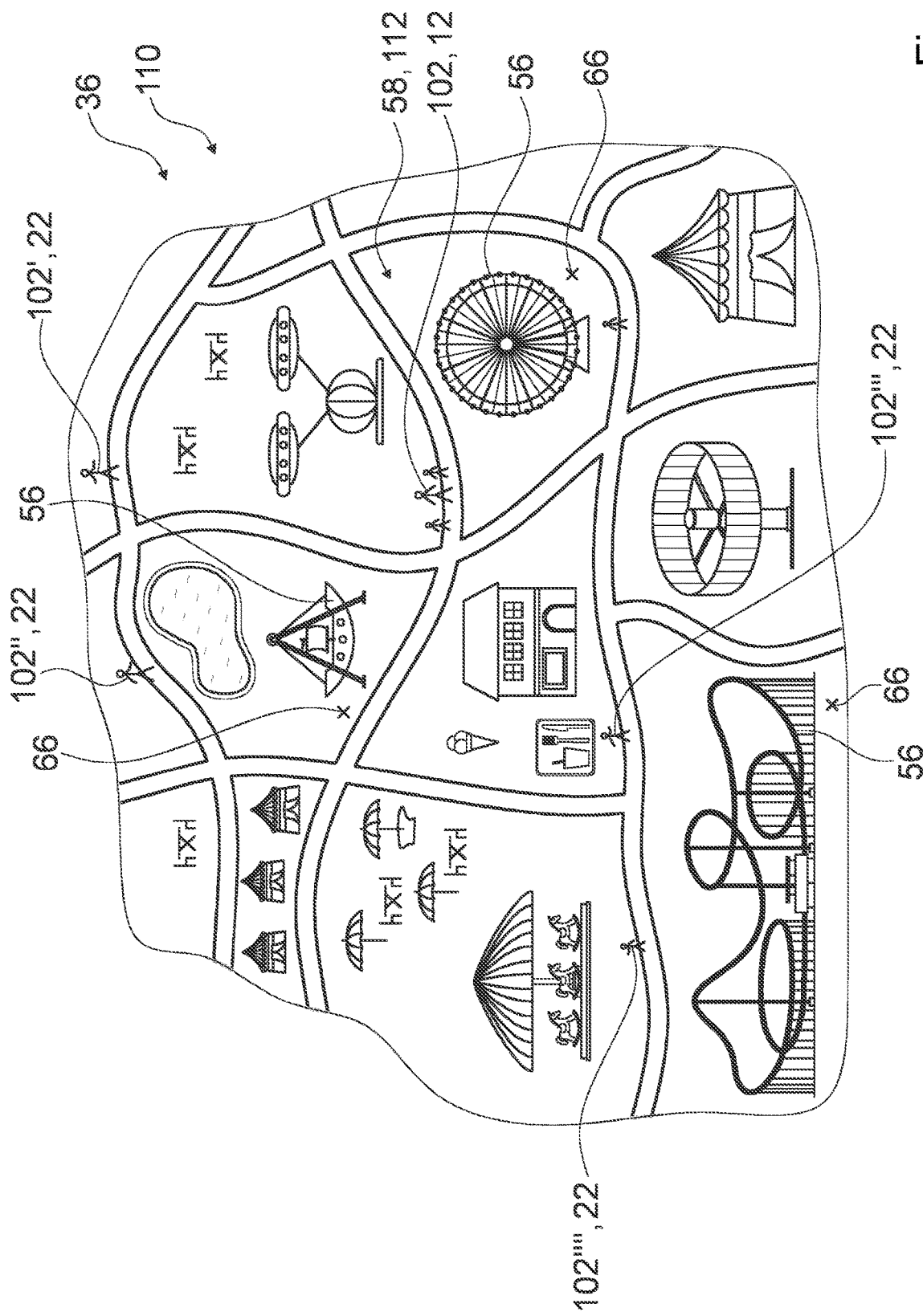
Figure 7:
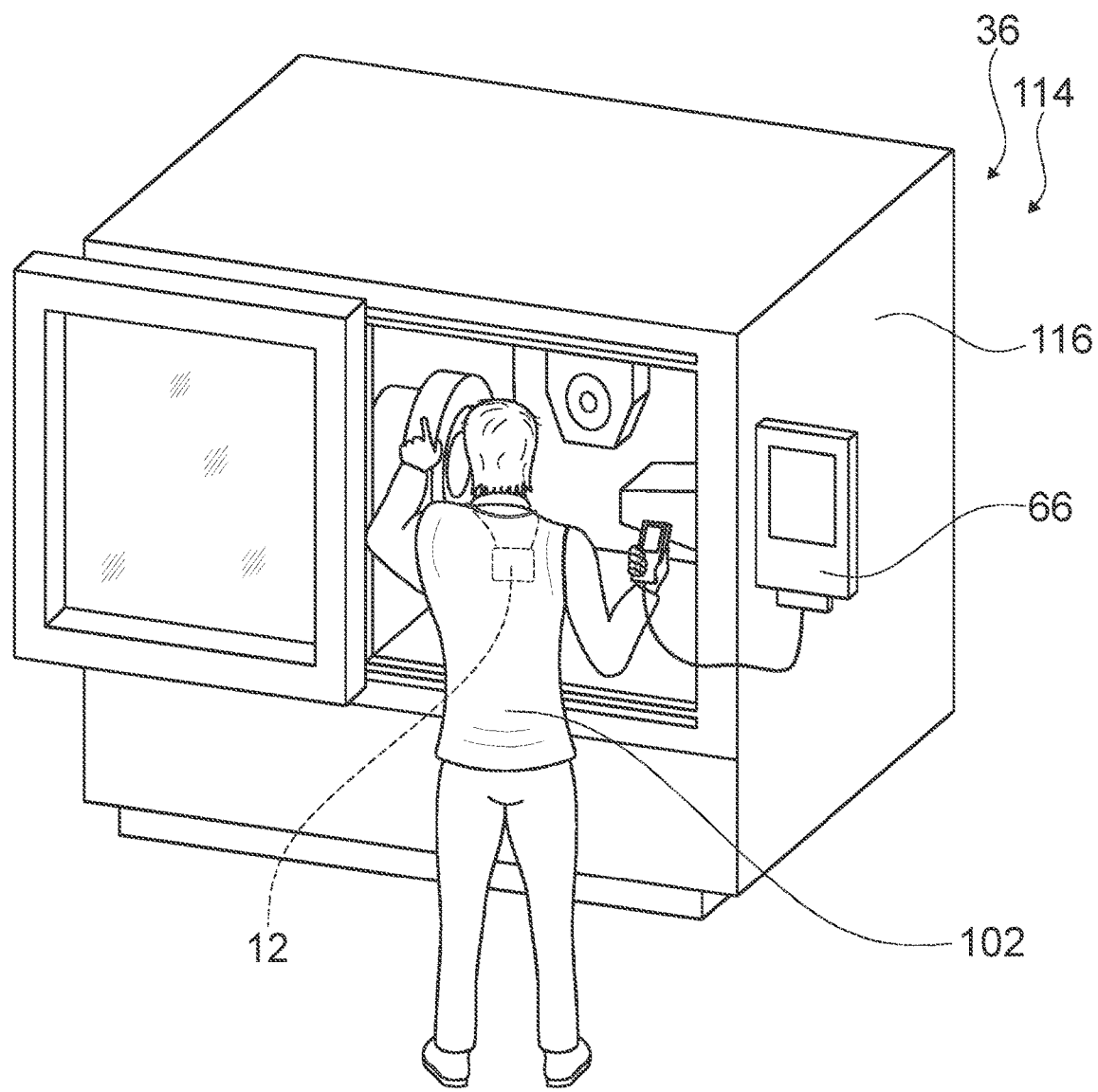
Figure 8:
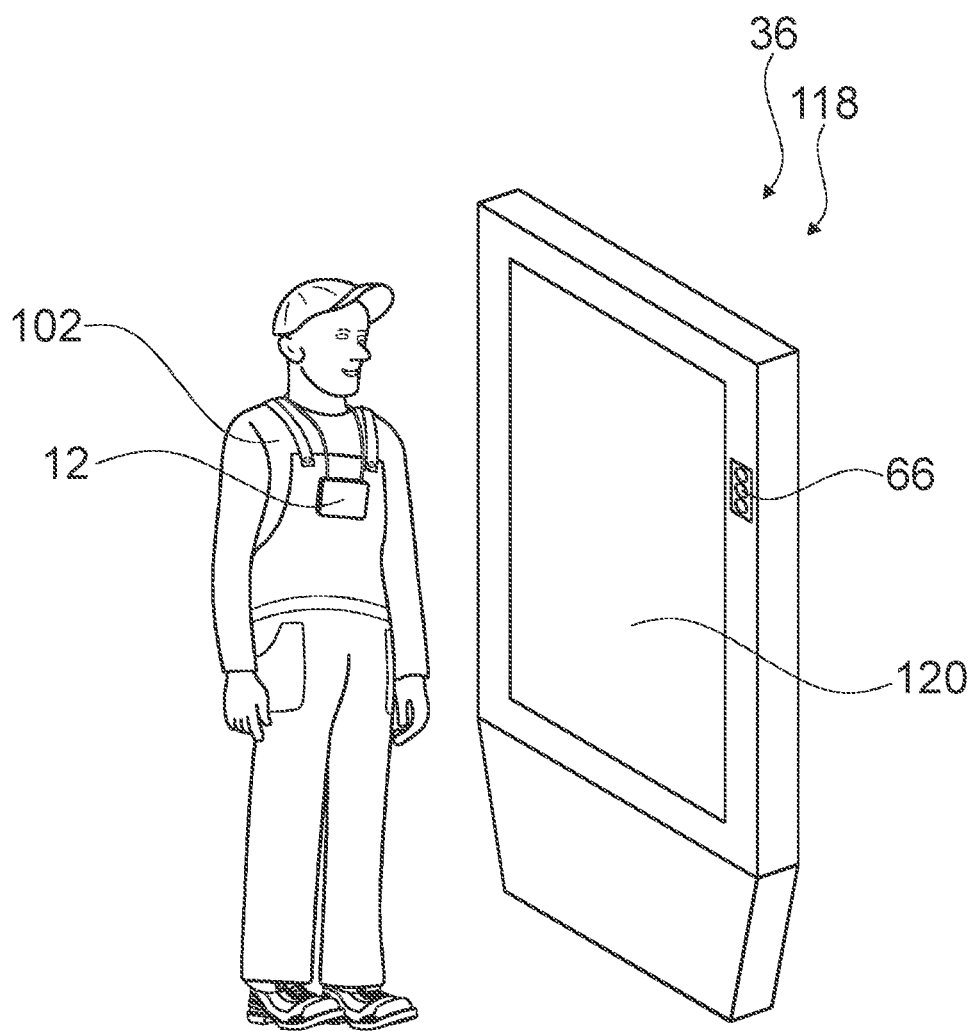
Figure 9:
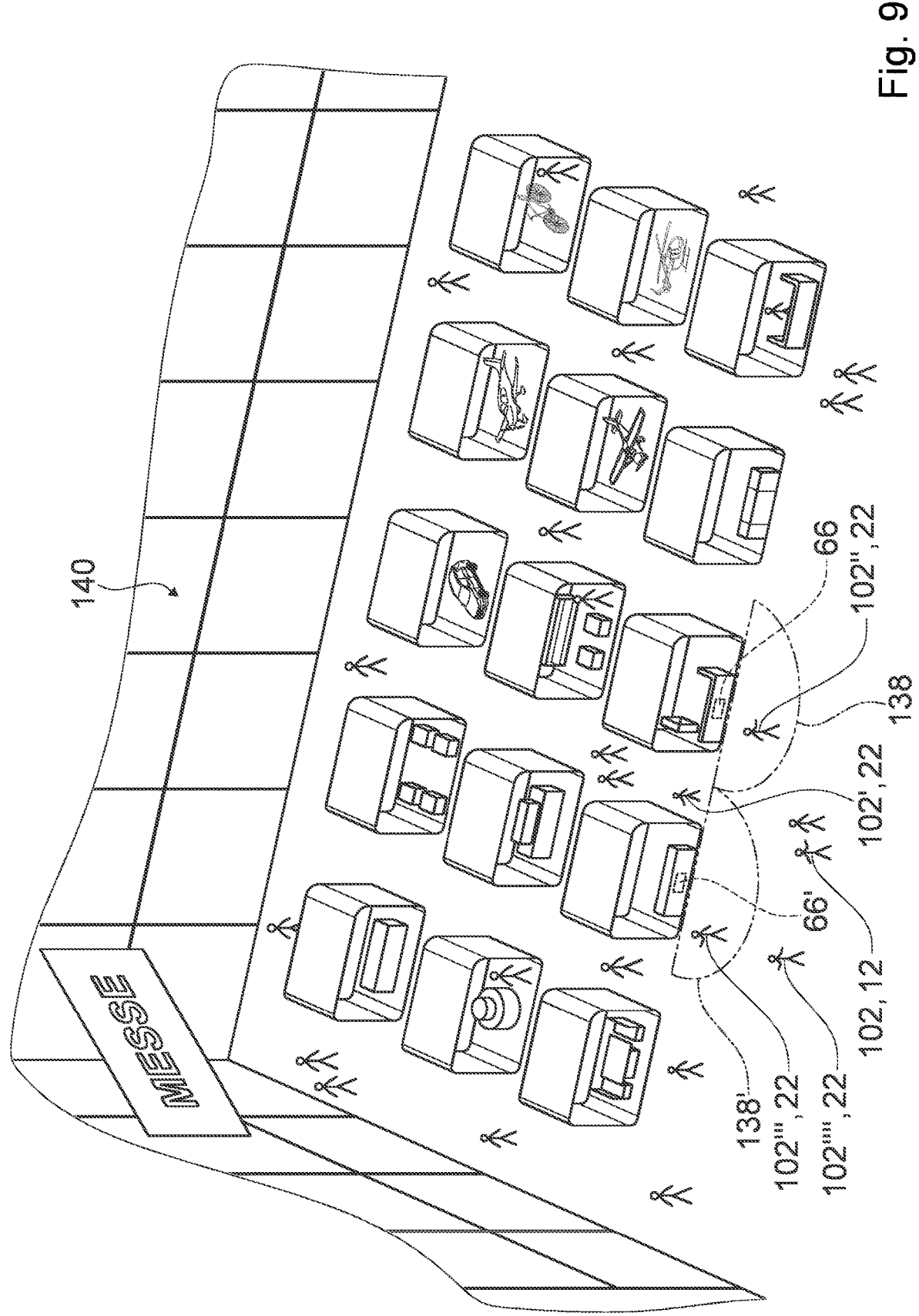
Figure 10:
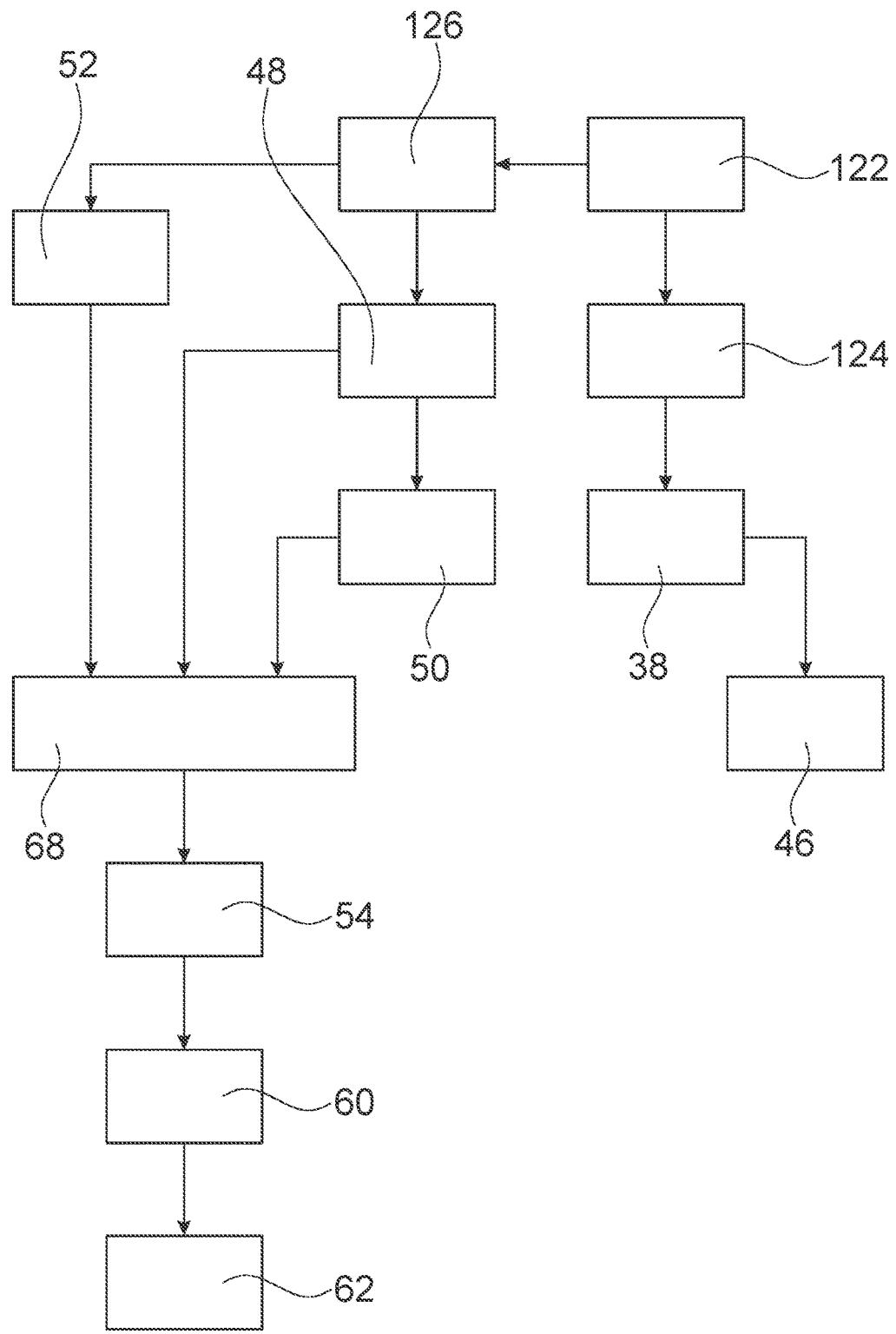
Figure 11:
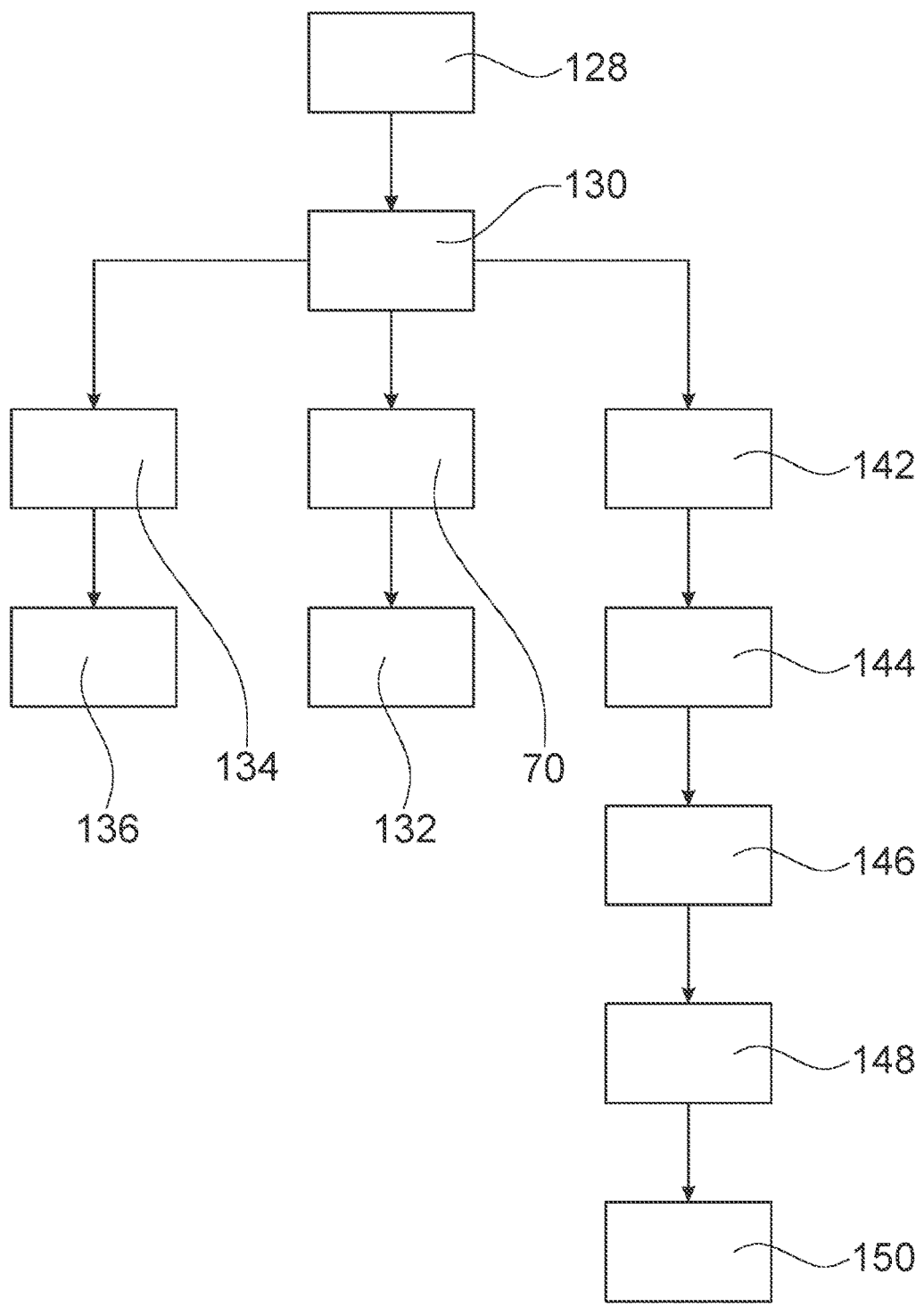

FIG. 3 shows an exemplary output of a display screen of the multifunctional tag, FIG. 4 shows a system designed as a social-distancing system with a plurality of multifunctional tags which interact with one another, FIG. 5 shows a system designed as a supervision system with a plurality of multifunctional tags which interact with one another, FIG. 6 shows a system designed as a system for controlling a stream of visitors with a plurality of multifunctional tags which interact with one another, FIG. 7 shows a system designed as an access control system with a plurality of multifunctional tags which interact with one another, FIG. 8 shows a system designed as an attention monitoring system with a plurality of multifunctional tags which interact with one another, FIG. 9 shows a system designed as a data-push system with a plurality of multifunctional tags which interact with one another, FIG. 10 shows a schematic flow diagram of a method which can be performed with the system, and FIG. 11 shows a schematic flow diagram of a further method which can be performed with the system.

DESCRIPTION OF THE EXEMPLARY EMBODIMENTS

Figure 1:
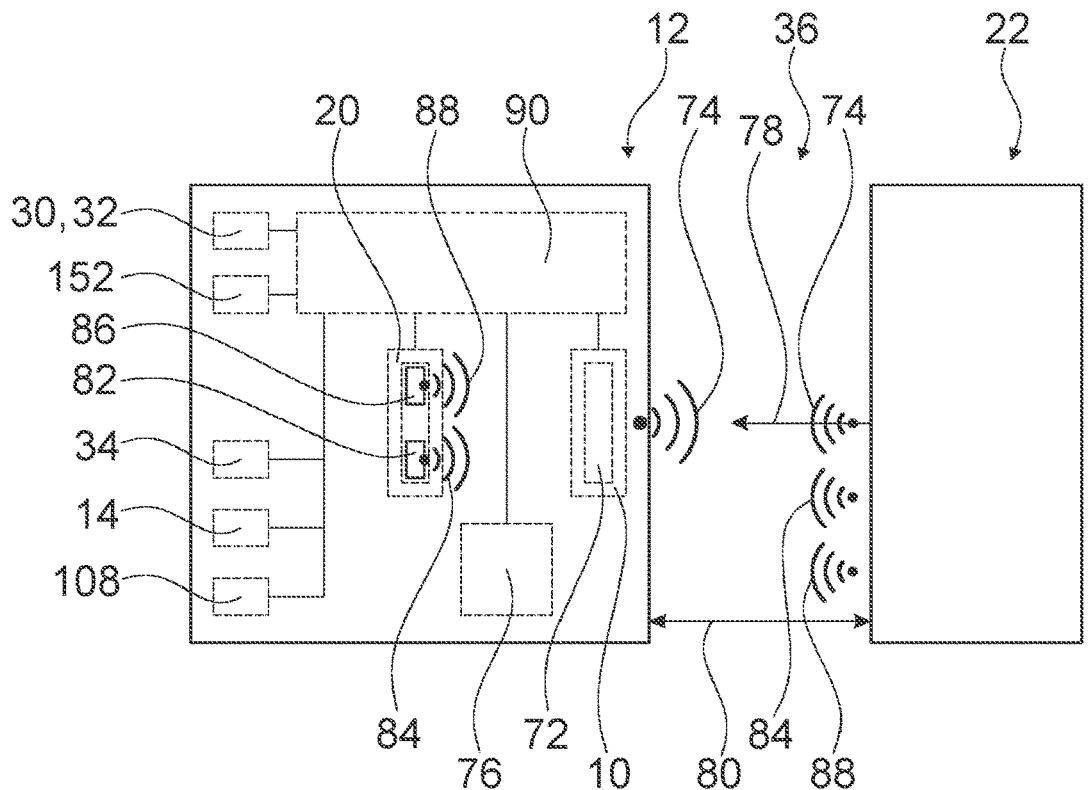
FIG. 1 shows a schematic illustration of a multifunctional tag.

FIG. 1 shows schematically a multifunctional tag 12 according to the invention. The multifunctional tag 12 has a plurality of sensors 10, 14, 20 which are configured for implementing a plurality of functions, in particular functions based on distance and direction measurements. The multifunctional tag 12 has a first monitoring sensor unit 10. The first monitoring sensor unit 10 is configured for the purpose of omnidirectional direction determination with respect to at least one further multifunctional tag 22. The first monitoring sensor unit 10 is configured for the purpose of omnidirectional distance determination with respect to at least one further multifunctional tag 22. The first monitoring sensor unit 10 has an ultra-wideband (UWB) transceiver 72. The ultra-wideband (UWB) transceiver 72 is configured for distance and direction determination in the vicinity. The ultra-wideband (UWB) transceiver 72 is configured for distance and direction determination at long range. The ultra-wideband (UWB) transceiver 72 has a different design from a UWB radar sensor. The ultra-wideband (UWB) transceiver 72 comprises a UWB transmitter which is configured for the purpose of emitting a UWB signal 74. The ultra-wideband (UWB) transceiver 72 comprises a UWB receiver which is configured for the purpose of receiving a UWB signal 74, in particular a UWB signal 74 emitted by a UWB transmitter of an ultra-wideband (UWB) transceiver 72 of a further multifunctional tag 22.

The second monitoring sensor unit 20 is configured for the purpose of direction-restricted, in particular cone of vision-restricted, distance determination with respect to further multifunctional tags 22. The second monitoring sensor unit 20 has an ultrasonic transceiver 82. The ultrasonic transceiver 82 comprises an ultrasonic transmitter which is configured for the purpose of emitting an ultrasonic signal 84. The ultrasonic transceiver 82 comprises an ultrasonic receiver which is configured for the purpose of receiving an ultrasonic signal 84, in particular an ultrasonic signal 84 emitted by an ultrasonic transmitter of an ultrasonic transceiver 82 of a further multifunctional tag 22. The second monitoring sensor unit 20 has an EM transceiver 86 for high-frequency electromagnetic waves. The EM transceiver 86 comprises an HF transmitter which is configured for the purpose of emitting an electromagnetic high-frequency signal 88. The EM transceiver 86 comprises an HF receiver which is configured for the purpose of receiving an electromagnetic high-frequency signal 88, in particular an electromagnetic high-frequency signal 88 emitted by an HF transmitter of an EM transceiver 86 of a further multifunctional tag 22. The ultrasonic transceiver 82 and the EM transceiver 86 are configured in combination for the purpose of barrier-sensitive vicinity distance determination by obtaining travel time differences of sound waves (the ultrasonic signal 84) and electromagnetic waves (the electromagnetic high-frequency signal 88) between two multifunctional tags 12, 22. The signals 84, 88 emitted by the EM transceiver 86 and by the ultrasonic transceiver 82 are in a fixed relationship, in particular in terms of time, with each other. It is conceivable that an additional piece of information, in particular a piece of identity information of the respective multifunctional tag 12, 22, is transmitted at least with the ultrasonic signal 84 and/or at least with the electromagnetic high-frequency signal 88 (for example via a modulation of the ultrasonic signal 84 and/or the electromagnetic high-frequency signal 88 or via a separate additional ultrasonic signal and/or via a separate additional electromagnetic signal).

The multifunctional tag 12 has a computing unit 76. The computing unit 76 is configured to analyze the received UWB signal 74. The computing unit 76 is configured to analyze the received ultrasonic signal 84. The computing unit 76 is configured to analyze the received electromagnetic high-frequency signal 88. The computing unit 76 is configured to determine from the received UWB signal 74 the direction 78 from which the UWB signal 74 is originating. The computing unit 76 is configured to determine from the received UWB signal 74, from combinations of received electromagnetic high-frequency signals 88 and ultrasonic signals 84, the distance 80 from which the UWB signal 74 is originating. The computing unit 76 is configured to determine the distance 80 and/or direction 78 from which the combined signals 84, 88 are originating. A "computing unit" 76 is to be understood as a unit with an information input, an information processor, and an information output. The computing unit advantageously has at least a processor, a memory, input and output means, further electrical components, an operating program, closed-loop control routines, open-loop control routines, and/or calculation routines. The components of the computing unit 76 are arranged on a common printed circuit board.

The multifunctional tag 12 has a wireless communication interface 32. The wireless communication interface 32 is configured for the purpose of exchanging data signals by radio, for example with further multifunctional tags 22 or other external receivers. The wireless communication interface 32 is configured for the purpose of receiving and sending electromagnetic signals which are different from the UWB signal 74 and from the electromagnetic high-frequency signal. The wireless communication interface 32 can be configured for the purpose of sending the separate additional electromagnetic signal which carries the identity information.

The multifunctional tag 12 has a wireless energy supply interface 30. The wireless energy supply interface 30 is designed as an inductive wireless energy supply interface which is configured to extract electrical energy from a magnetic alternating field. The multifunctional tag 12 has a rechargeable battery 90. The rechargeable battery 90 is configured for the purpose of supplying energy to the first monitoring sensor unit 10. The rechargeable battery 90 is configured for the purpose of supplying energy to the second monitoring sensor unit 20. The rechargeable battery 90 is configured for the purpose of supplying energy to the computing unit 76. The rechargeable battery 90 is configured for the purpose of supplying energy to the wireless communication interface 32. The wireless energy supply interface 30 is configured for the purpose of charging the rechargeable battery 90. In the exemplary embodiment illustrated by way of example in the figures, the communication interface 32 and the energy supply interface 30 are designed integrally with each other such that the data transmission of the communication interface 32 and the energy transmission of the energy supply interface 30 take place via the same magnetic alternating field. The wireless communication interface 32 can in addition additionally comprise a wireless payment interface, a radio key interface, and/or a wireless identification interface.

The multifunctional tag 12 has an inertial measurement unit 14 (IMU). The rechargeable battery 90 is configured for the purpose of supplying energy to the inertial measurement unit 14. The multifunctional tag 12 has a vibration signal transmitter 34 which is configured for generating a vibration of the multifunctional tag 12 which can be felt for a wearer 102 of the multifunctional tag 12, for example via a casing 28 of the multifunctional tag 12. The rechargeable battery 90 is configured for the purpose of supplying energy to the vibration signal transmitter 34. The multifunctional tag 12 has a concealment sensor 152. The concealment sensor 152 is configured to detect concealment of a display screen 16 of the multifunctional tag 12, for example by means of a brightness determination. The concealment sensor 152 takes the form of a photoconductive cell. The rechargeable battery 90 is configured for the purpose of supplying energy to the concealment sensor 152.

Figure 2:
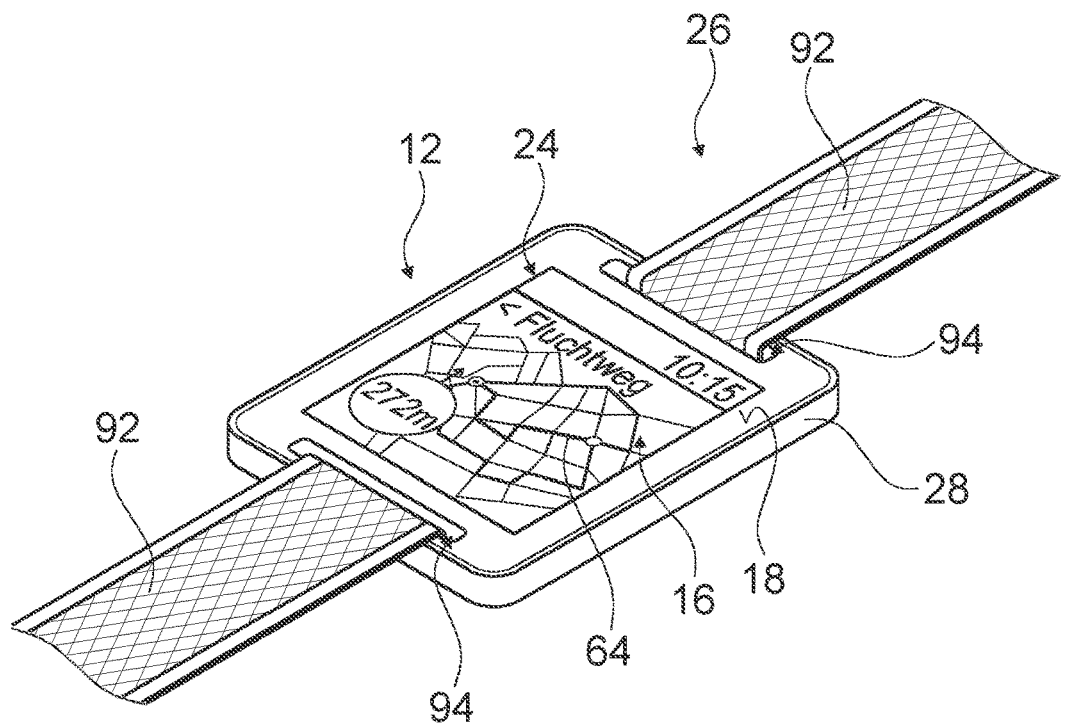
FIG. 2 shows a schematic perspective view of the multifunctional tag.

FIG. 2 shows an exemplary perspective view of the multifunctional tag 12. The multifunctional tag 12 has a casing 28. The casing 28 houses the sensors 10, 14, 20 and the computing unit 76 of the multifunctional tag 12. The casing 28 borders the multifunctional tag 12 externally. The casing 28 is hermetically sealed. The casing 28 is splash-proof. The casing 28 is free of plug connections such as, for example, a plug for a charging cable. The casing 28 has external dimensions which are smaller than 10 cm×10 cm×3 cm.

The multifunctional tag 12, in particular the casing 28, has a fastening device 26. The fastening device 26 is configured to fasten the multifunctional tag 12 to a mobile object or to a living being, for example to a person (the wearer 102) or to an animal. The fastening device 26 comprises at least one strap 92. The strap 92 can take the form of, inter alia, a lanyard, a chest strap, a type of belt, or a bracelet. The fastening device 26 comprises at least one eyelet 94 through which the strap is passed. The eyelet 94 is formed by a recess in the casing 28. The fastening device 26 can have just one eyelet 94 or a plurality of eyelets 94.

The multifunctional tag 12 has the display screen 16. The display screen 16 is integrated into the multifunctional tag 12. The display screen 16 is integrated into the casing 28 of the multifunctional tag 12. The display screen 16 is configured for showing data and/or evaluations of at least one sensor 10, 14, 20 and/or the computing unit 76 of the multifunctional tag 12. The display screen 16 is designed as a color display screen. The display screen 16 covers a large portion of a surface 18 of one side 24 of the multifunctional tag 12 on which the display screen 16 is arranged. The display screen 16 has an area which is larger than 40 mm×40 mm. The display screen 16 is designed as a touch display. The touch display forms an input interface of the multifunctional tag 12. FIG. 3 shows an exemplary output of the display screen 16 via which the plurality of different functions of the multifunctional tag 12 can be selected.

FIGS. 4 to 9 in each case show systems 36 with a plurality of multifunctional tags 12, 22 which interact with one another and are associated in each case with different mobile objects and/or living beings. Some of the systems 36 have one or more immovably mounted anchor stations 66. The anchor stations 66 can each be associated with an object or a target region 56, or the like. The anchor stations 66 each have at least the first monitoring sensor unit 10 which is configured for the purpose of omnidirectional distance and direction determination with respect to at least one movable multifunctional tag 12, 22. The anchor stations 66 form at least in part at the same time charging trays for the multifunctional tags 12, 22. Illustrated in FIGS. 4 to 9 are different use cases according to the invention of the system 36 according to the invention with a plurality of multifunctional tags 12, 22 and/or anchor stations 66.

In the example in FIG. 4, the system 36 forms a social-distancing system 96. The social-distancing system 96 is configured for the purpose of monitoring and/or avoiding risks of infection, for example from pathogens which can be transmitted via the air such as, inter alia, the SARS CoV2 virus. The social-distancing system 96 is configured for the purpose of monitoring adherence to a minimum distance 40 between people, in particular between wearers 102, 102', 102", 102''', 102'''' of multifunctional tags 12, 22. The minimum distance 40 and an advance-warning minimum distance 98 of the multifunctional tag 12 of a first wearer 102 are marked by the circles in dashed lines. A cone of vision 100 of the second monitoring sensor unit 20 of the multifunctional tag 12 of the first wearer 102 is marked by the cone in dashed lines. In the example in FIG. 4, a second wearer 102' of a further multifunctional tag 22 is situated inside the minimum distance 40 and inside the cone of vision 100. This situation is registered by the social-distancing system 96 as a direct risk of contact. In the example in FIG. 4, a third wearer 102" of a further multifunctional tag 22 is situated inside the minimum distance 40 but outside the cone of vision 100. This situation is registered by the social-distancing system 96 as an indirect direct risk of contact. In the example in FIG. 4, a fourth wearer 102''' of a further multifunctional tag 22 is situated outside the minimum distance 40 but inside the advance-warning minimum distance 98. This situation is not registered by the social-distancing system 96 as a risk of contact. However, the respective wearers 102, 102''' of the multifunctional tags 12, 22 are warned in advance, for example via the display screens 16 of the multifunctional tags 12, 22, that a risk of contact could be imminent. This is shown, by way of example, in the upper right-hand inset of FIG. 3. As a result, the respective wearers 102, 102''' can react and take countermeasures. In the example in FIG. 4, a fifth wearer 102'''' of a further multifunctional tag 22 is situated outside the minimum distance 40 but outside the advance-warning minimum distance 98. This situation is not registered by the social-distancing system 96 as a risk of contact. Also, no advance warning is made. Nevertheless, the respective multifunctional tags 12, 22 record the relative movements and the wearers 102, 102'''' can call up via the display screen 16 the distances and/or directions of the other wearers 102, 102''''. An example of a display of relative positions of further multifunctional tags 22 in the environment of the multifunctional tag 12 depicted is shown in the central inset of FIG. 3.

It is additionally conceivable that one or more of the multifunctional tags 12, 22 has a GNSS (global navigation satellite system) receiver 108 (cf FIG. 1) or that one or more of the multifunctional tags 12, 22 is coupled to an external GNSS receiver 108 associated with the respective wearer 102, 102', 102''', 102'', 102''''. The GNSS receiver 108 is configured for the purpose of determining geographical position coordinates on the basis of received satellite data, for example NAVSTAR GPS satellite data, GLONASS satellite data, GALILEO satellite data, or Baidou satellite data. The GNSS receiver 108 in this case forms an anchor by means of which the geographical position of the multifunctional tag 12 coupled to the respective GNSS receiver 108, as well as the geographical positions of all further multifunctional tags 22 registered by the respective multifunctional tag 12, can be determined and can be shown preferably on a geographical map. For example, mobile geographical maps of areas 58 with the positions of all the active multifunctional tags 12, 22 situated in the areas 58 can as a result be shown on the display screen 16 of the multifunctional tag 12 or on an external display screen 16, coupled to the multifunctional tag 12, for example of a smartphone.

Alternative applications of the social-distancing system 96 in FIG. 4 are of course conceivable. In an exemplary alternative application of the social-distancing system 96 forming a hunt participant safety system, a multifunctional tag 12, 22 is associated with each participant in a hunt, for example a driven hunt, in particular with the hunters and the dogs. In particular in combination with the associated GNSS receiver 108, a risk of so-called "friendly fire" can be reduced. In particular, it is conceivable that a "do not shoot" warning is indicated on the display screen 16 of a multifunctional tag 12 of a participant in the hunt as long as a further multifunctional tag 22 of one of the further participants in the hunt is potentially situated in the line of fire of the participant. Comparable applications are conceivable for police and/or military missions, in particular training missions. Relative positions of wearers 102 of the multifunctional tags 12, 22 (people/dogs) with respect to one another could here be displayed by means of the multifunctional tags 12, 22. If in addition one or more wearers 102 of multifunctional tags 12, 22 additionally wear another mobile, battery-operated high-precision GNSS receiver 108 which serves as an anchor, the positions of all wearers 102 of multifunctional tags 12, 22, i.e. in this case all the hunters, beaters, and dogs, could even be indicated precisely on a map, for example a cellphone map.

In the example in FIG. 5, the system 36 forms a supervision system 104. The supervision system 104 from FIG. 5 is configured for the purpose of supervising people, in particular children, or animals, for example dogs. The supervision system 104 is configured for the purpose of registering when the supervised person or the supervised animal leaves a supervised region 106, 106'. A wearer 102 of the multifunctional tag 12 here forms a supervisor. Alternatively, the supervisor can also be formed by the anchor station 66. Further wearers 102', 102" of further multifunctional tags 22 here form the supervisees. The supervision region 106 can move as the wearer 102 who forms the supervisor moves. In particular in large and confusing crowds, for example in the case of a public festival or in an amusement park, advantageous supervision of children running free in the crowd and sometimes disappearing can be enabled as a result. An alternative supervision region 106' can be fixed geographically (in FIG. 5, the supervision region 106' is specified, for example, as a property boundary of a detached house). The size and shape of the moving supervision region 106 and/or of the stationary supervision region 106' can be fixed in advance or can be set by the wearer 102 of the multifunctional tag 12. The supervision region 106 predetermines a direction-dependent maximum distance 42 or direction-independent maximum distance 42'. When one of the supervisees leaves the supervision region 106, 106', an acoustic, optical, and/or mechanical warning notification is outputted to the supervisor. The supervision system 104 is in addition configured to facilitate finding the supervised people (children) or animals. For this purpose, a current distance and/or a current relative direction can be called up on the display screen 16 for the purpose of temporarily orienting the multifunctional tag 12, as is shown by way of example in the left-hand middle inset (animals) and left-hand bottom inset (children) in FIG. 3. In addition, it is conceivable that a site map, in particular of the surroundings of the supervision region 106, 106', is stored on the multifunctional tag 12 and is displayed together with the whereabouts of the supervisees.

Alternatively, the further multifunctional tag 22 can also be arranged on a mobile object, the movement of which can be monitored via the supervision system 104. For example, a musician traveling by train places the further multifunctional tag 22 in an instrument case stowed in a luggage rack of a train car, whilst he keeps the multifunctional tag 12 on him. If the instrument case is now removed unnoticed by the musician, he receives a warning message and/or an alarm, in particular a theft alarm, when a specified maximum distance 42 is exceeded and a theft of the instrument case can if necessary thus be avoided. In addition, it is conceivable that in this case the multifunctional tag 12 is realized in such a way that a change in the orientation of the further multifunctional tag 22, for example by taking the instrument case down from the luggage rack, which can be detected by the inertial measurement unit 14 of the multifunctional tag 12, triggers the warning message and/or the alarm. The alarm can comprise a vibration caused by the vibration signal transmitter 34 and/or an output of a warning tone.

In the example in FIG. 6, the system 36 forms a system 110 for controlling a stream of visitors. The system 110 for controlling a stream of visitors from FIG. 6 is configured for the purpose of controlling streams of visitors in an area 58 forms by way of example an amusement park 112. Alternatively, the system 110 for controlling a stream of visitors can be configured for the purpose of controlling any desired further streams of visitors, for example in a trade fair, at a public festival, in a shopping center, at a tourist attraction, in a museum, in a zoo, in a botanical garden, in an educational institution, at a sporting event, at a festival, etc. The system 110 for controlling a stream of visitors is configured for the purpose of registering and evaluating the whereabouts and movements of visitors inside the area 58. The system 110 for controlling a stream of visitors is configured for the purpose of outputting, on the basis of the registered and evaluated data, advice and/or news to the visitors, in particular the wearers 102 of the multifunctional tags 12. The display screens 16 of the multifunctional tags 12 and/or alarm facilities of the multifunctional tags 12 can be used to output the advice and/or news to the wearers 102 of the multifunctional tags 12. The advice and/or news can comprise information which prompts the wearer 102 of the multifunctional tag 12 to take a certain route such as, for example, route suggestions, waiting times at different target regions 56 (in this case, rides in the amusement park 112), advice about overcrowding, special offers (for example, "free balloons available right now at the boat swing"), etc. In the case illustrated by way of example, each visitor to the amusement park 112 receives at the entrance a multifunctional tag 12 which they wear throughout their visit to the amusement park. The multifunctional tag 12 of each visitor interacts with the further multifunctional tags 22 of the other visitors.

The multifunctional tags 12, 22 interact with the anchor stations 66. The anchor stations 66 are installed in a fixed position and distributed over the whole area 58. At least some of the anchor stations 66 are associated with specific target regions 56. In addition, it is conceivable that the multifunctional tags 12, 22 and/or the anchor stations 66 communicate with a central computing unit (not illustrated) which undertakes the evaluation of the visitor movements. Alternatively, however, an embodiment with no central computing unit is also conceivable in which, for example, each multifunctional tag 12, 22 itself draws conclusions from the data which it receives from the other multifunctional tags 12, 22 and/or from the anchor stations 66 and outputs therefrom the advice and/or news controlling the stream of visitors to the respective wearer 102. It is also conceivable that the respective multifunctional tags 12, 22 receive data from the anchor stations 66 and it is taken into account when producing the advice and/or news controlling the stream of visitors. For example, the anchor stations 66 associated with the target regions 56 can transmit respective visitor numbers and/or waiting times at the target regions 56, determined by the interaction of the anchor station 66 with the multifunctional tags 12, 22 registered in the target region 56, to the multifunctional tags 12, 22. The advice and/or news controlling the stream of visitors can be incorporated, for example, into an overview map of the area 58 illustrated on the display screen 16. An example of an overcrowding display of an area 58 in the form of a trade fair site is illustrated in the middle bottom inset in FIG. 3. An example of a map display with a proposed route in an area 58 is illustrated in the middle top inset in FIG. 3. Instead of an escape route, a proposed route through the area 58 could, for example, also be displayed here in which large crowds are avoided as far as possible or people are preferably directed to target regions 56 where there are currently fewer visitors.

The multifunctional tag 12 can in addition also undertake further additional functions. For example, the multifunctional tag 12 can be used in the amusement park 112 as an entrance ticket (see also top left-hand inset in FIG. 3: trade fair visitor pass). For example, the multifunctional tag 12 can be used as proof of authorization for certain activities or the like. In the amusement park example, an age/height check could, inter alia, be performed at certain target regions 56 (rides). The wireless communication interface 32 (radio key interface) and/or a display on the display screen 16 (for example, a barcode or the like) could, for example, here be used to open a barrier for a target region 56 (ride). In the amusement park example, fast lane authorization at certain target regions 56 (rides) could, inter alia, be checked. The wireless communication interface 32 (wireless identification interface) and/or a display on the display screen 16 (for example, a barcode or the like) could, for example, here be used to prove or to check the authorization. For example, the multifunctional tag 12 can be used for payment within the area 58, for example at a food outlet (wireless payment interface). Alternatively, services, for example food checks, can be recorded by the multifunctional tag 12 and be read out and paid for when leaving the area 58. For example, the vibration signal transmitter 34 of the multifunctional tag 12 can be used to notify the visitor to the food outlet, in particular in a self-service food outlet.

In the event of a disaster such as, for example, a flooding event or a fire, it is possible with such a system 36, for example in the amusement park 112 or elsewhere (offices, production halls, etc.), simply to establish where there are still individual people (wearing the multifunctional tag 12, 22). It is also conceivable that firefighters are equipped with multifunctional tags 12, 22. Even when a large amount of smoke gas is produced, the position of the firefighters can be monitored by means of the technology used. Even if there are no anchor stations 66 installed in the relevant areas, it is then nevertheless possible for the firefighters to reliably locate one another. It would furthermore also be conceivable in this example for mobile anchor stations to be installed in fire trucks which could be posted, for example, around the site of the fire, as a result of which precise localization would be made possible. In addition, it is conceivable that it is made possible for missing firefighters to be found by other firefighters via a signal transmission device of the multifunctional tag 12, 22 or a locator device. For this purpose, an audio signal which becomes louder, changes its tone, or becomes faster is, for example, outputted by the multifunctional tags or the locator devices as soon as the multifunctional tags approach each other. As a result, people could advantageously be guided to each other even in the thickest smoke.

In the example in FIG. 7, the system 36 forms an access control system 114. The access control system 114 from FIG. 7 is configured for the purpose of checking authorization to access an object or authorization to operate an object. The object takes the form, by way of example, of industrial plant 116, in particular a machine tool. An anchor station 66 is associated with the industrial plant 116. A multifunctional tag 12 is associated with an operator of the industrial plant 116.

The approach of the wearer 102 of the multifunctional tag 12 to the industrial plant 116 is registered by the interaction between the anchor station 66 and the multifunctional tag 12. When the approach is detected, in particular automatically, via the wireless communication interface 32, the authorization of the wearer 102 of the multifunctional tag 12, the identity of whom is saved on the multifunctional tag 12, is checked. Depending on the authorization status of the wearer 102, access to and/or operation of the industrial plant 116 is unlocked or blocked, in particular automatically, for the wearer 102 of the multifunctional tag 12. The same procedure can also take place in order to check authorization to access rooms in which, for example, industrial plant 116 is situated. In addition, it is conceivable that, before the industrial plant 116 is automatically unlocked, a check is made as to whether another operator, for example another wearer 102' of a further multifunctional tag 22, is already currently operating the industrial plant 116. In order to avoid accidents, operation of the industrial plant 116 could then, for example, be permitted at any point in time always for just a single wearer 102, 102' of a multifunctional tag 12, 22 or the industrial plant 116 could be stopped until one of the two wearers 102, 102' has again moved far enough away from the industrial plant 116.

Alternatively or additionally, it is possible for a distance from an object such as, for example, a maintenance door of the industrial plant 116 to be measured particularly accurately by means of the multifunctional tag 12, 22, in particular by means of the first monitoring sensor unit 10 and/or preferably by means of the ultrasonic transceiver 82 of the second monitoring sensor unit 20. If now the multifunctional tag 12, 22 is situated within a specifiable minimum distance of, for example, 20 cm around the object for a specifiable period of time, for example more than 2 seconds, an action is triggered, for example the maintenance door opened. Different authorization levels can here be assigned to the multifunctional tag 12, 22. In the exemplary environment in which the industrial plant 116 is situated, for example in a production environment, when the action is triggered, an entry could automatically be made in a machine handbook or a logbook of the industrial plant 116, along with the obtained ID number. As a result, it is advantageously possible to ensure that only access-authorized people have access to the object and that this is documented. The object must in this case also be equipped with receiving and emitting hardware, for example with a further multifunctional tag 22 or with an anchor station 66.

In the example in FIG. 8, the system 36 forms an attention monitoring system 118. The attention monitoring system 118 in FIG. 8 is configured for the purpose of registering a measurement of attention, in particular a viewing time, of a wearer 102 of the multifunctional tag 12 when viewing an object or an event. In the example in FIG. 8, the object takes the form of an advertising display 120, in particular a screen, on which advertising films are played. An anchor station 66 is associated with the object. The viewing time for which the wearer 102 of the multifunctional tag 12 studies the advertising display is determined by virtue of an interaction of the multifunctional tag 12 with the anchor station 66, in particular including registering a direction of sight of the wearer 102 by means of the second monitoring sensor unit 20. If a certain value of the measurement of attention is exceeded, for example if it is established that the wearer 102 of the multifunctional tag 12 has watched the whole of an advertising clip, a transfer is made of remuneration, for example a sum of money, to an account of the wearer 102 of the multifunctional tag 12. Either there is a direct financial transaction between the anchor station 66 and the multifunctional tag 12 or the identity of the wearer 102 is transmitted by the multifunctional tag 12 to the anchor station 66 which then arranges the financial transaction via other channels (for example, a refund when leaving an area 58 in which the advertising display 120 is arranged, a discount for a future payment transaction within the area 58 in which the advertising display 120 is arranged, a direct transfer to an external account/cyberwallet, or the like which is transmitted to the anchor station 66 at the same time).

It is in addition conceivable that the object or the multifunctional tag 12, 22 has a device which is configured for the purpose of computer-assisted and/or sensor-based recording of a reaction of the wearer 102 of the multifunctional tag 12, 22 to the contents of the object (for example, the advertising clip). In particular, the object or the multifunctional tag 12, 22 comprises for this purpose a sensor unit (not illustrated in detail). The sensor unit preferably comprises an optical sensor system such as, for example, a CCD camera and/or an acoustic sensor system such as, for example, a microphone, which in each case preferably communicate their images and recordings to an internal or external (for example, cloud-based) sensor data processing system. The sensor unit, in particular in combination with the sensor data processing system, is preferably configured to record an image (for example of the wearer 102 of the multifunctional tag 12, 22), a tone (for example of the wearer 102 of the multifunctional tag 12, 22), a biometric feature of the wearer 102 of the multifunctional tag 12, 22 (for example heart rate, blushing, paleness, blood pressure, etc.), an interaction of the wearer 102 of the multifunctional tag 12, 22 with the object, such as actuating a button or another touch-sensitive element of the object, or a gesture performed by the wearer 102 of the multifunctional tag 12, 22. In particular, in the case of computer-assisted and/or sensor-based recording in the event of image recognition or audio detection, facial recognition, emotion recognition, and/or gesture recognition is performed, or in the event of audio detection, speech recognition and/or voice recognition is performed. The reaction (s) of the wearer 102 of the multifunctional tag 12, 22 which is or are recorded and registered by the sensor unit could be a conscious or unconscious reaction or reactions of the wearer 102 of the multifunctional tag 12, 22 to the object. Depending on the reactions recorded by the sensor unit, a transaction of points, values, and/or (crypto) currencies can then be transmitted to the wearer 102 of the multifunctional tag 12, 22.

In the example in FIG. 9, the system 36 forms a data-push system 140. The data-push system 140 from FIG. 9 is configured for the purpose of automatically transferring data, for example information material or advertising data, from the anchor station 66 to the multifunctional tags 12 as soon as the multifunctional tag 12 falls below a minimum distance 138 from the anchor station 66, or about an event. The data can be saved in an internal memory of the multifunctional tag 12 or preferably shown directly on the display screen 16. For example, the data are shown on at least a part of the display screen 16 as long as the multifunctional tag 12 is situated inside a region formed by the minimum distance 138. If the multifunctional tag 12 moves out of the region formed by the minimum distance 138 and enters a comparable region of a further anchor station, the transmitted data are no longer displayed and instead data that the further anchor station has pushed to the multifunctional tag 12 is shown. The anchor stations 66 are configured for determining and storing the periods of time during which multifunctional tags 12 are situated within the region formed by the minimum distance 138, and/or during which the pushed data is shown on the display screens 16 of the respective multifunctional tags 12. The anchor stations 66 are configured for the purpose of determining, based on the determined periods of time, respective levels of digital currency transfers, in particular of compensations for viewing the advertising displays. The anchor stations 66 are configured for the purpose of initiating and/or performing the digital currency transfers to the multifunctional tags 12 and/or to accounts associated with the wearers 102 of the multifunctional tags 12.

The functions of the various proposed systems 36 can of course be meaningfully combined with one another as desired.

A schematic flow diagram of a method which can be performed with the system 36 is shown in FIG. 10. In at least one method step 122, multifunctional tags 12, 22 are activated and associated with respective wearers 102. The multifunctional tags 12, 22 are here fastened to the bodies or to the clothing of the wearers 102. UWB signals 74 and related ultrasonic signals 84 and electromagnetic high-frequency signals 88 are emitted by the activated multifunctional tags 12, 22. The activated multifunctional tags 12, 22 receive the UWB signals 74 and the related ultrasonic signals 84 and electromagnetic high-frequency signals 88 of the further multifunctional tags 22. The directions and/or the distances of the further multifunctional tags 22 are in each case obtained from the (omnidirectionally) received UWB signals 74. The distances of the further multifunctional tags 22 situated within the restricted cone of vision 100 are obtained from the travel time difference between the received related ultrasonic signals 84 and electromagnetic high-frequency signals 88.

In at least one further method step 124, a minimum distance 40 associated with a multifunctional tag 12, an advance-warning minimum distance 98, and/or a maximum distance 42 is specified. This can take place, for example, by manual input from the wearer 102, for example via the display screen 16. In at least one method step 38, a distance warning signal is generated when the distance between two multifunctional tags 12, 22 falls below the minimum distance 40 and/or when said distance exceeds a predeterminable maximum distance 42. The registered distances and directions are stored in a memory of the computing unit 76 of the multifunctional tag 12. The registered instances of the minimum distance 40 being exceeded and/or the registered instances where the distance falls below the maximum distance 42 are stored in the memory of the computing unit 76. The distance warning signal outputted in the method step 38 comprises a direction display 44 (cf FIG. 3). The direction in space in which the distance has fallen below the minimum distance 40 and/or in which the maximum distance 42 has been exceeded is shown via the direction display 44. Whether a distance warning signal is generated and/or in which manner the distance warning signal is outputted depends on whether a direct barrier-free contact is detected when it is recorded that the distance has fallen below a minimum distance or whether a contact protected by a barrier is detected. In the case of a direct barrier-free contact, signals from the first monitoring sensor unit 10 and from the second monitoring sensor unit 20 of the multifunctional tag 12 registering the contact are received by the same further multifunctional tag 22. In the case of a contact separated by a barrier, either only UWB signals 74 from the first monitoring sensor unit 10 or only electromagnetic signals from the two monitoring sensor units 10, 20 of the multifunctional tag 12 registering the contact are received by the same further multifunctional tag 22.

By monitoring the maximum distance 42, the moving away of mobile objects and/or living beings with which in particular a further multifunctional tag 22 is associated is detected by the multifunctional tag 12. In at least one method step 46, a proposal of a direction and/or route to follow 64 to find the object and/or the living being which in particular is moving away from the multifunctional tag 12 is made to the wearer 102 of the multifunctional tag 12 via the display screen 16 and in particular displayed to a wearer 102 of a multifunctional tag 12. The display of the direction and route to follow is updated in real time according to changing relative positions between the multifunctional tags 12, 22.

In at least one method step 126, anchor stations 66 are installed in a fixed position in an area 58. The anchor stations 66 are associated at least partially with certain different target regions 56, arranged apart from one another, within the area 58. In at least one method step 48 which can take place in particular independently of the method steps 124, 38, 46 for issuing a distance warning, a number of active multifunctional tags 12, 22 within the system 36, and in particular within a reception range of the multifunctional tags 12, 22 and/or within reception ranges of anchor stations 66 of the system 36, is determined. The anchor stations 66 are for this purpose arranged so that they are distributed over the area 58 within which it is intended to determine the number of multifunctional tags 12, 22.

In at least one method step 50 which can take place in particular independently of the method steps 124, 38, 46 for issuing a distance warning, a density distribution of active multifunctional tags 12, 22 within the system 36, and in particular within a reception range of the multifunctional tags 12, 22 and/or within reception ranges of anchor stations 66 of the system 36, is obtained. The density distribution is computed from the registered number of active multifunctional tags 12, 22 and their relative positions with respect to the anchor stations 66 are computed.

In at least one method step 52 which can take place in particular independently of the method steps 124, 38, 46 for issuing a distance warning, flows of active multifunctional tags 12, 22 within the system 36, and in particular within a reception range of the multifunctional tags 12, 22 and/or within reception ranges of anchor stations 66 of the system 36, are determined. The flows are determined from the registered movements and/or changes in position of the registered active multifunctional tags 12, 22 and their relative positions with respect to the anchor stations 66 are determined.

In at least one method step 68, a multifunctional tag flow analysis and/or a multifunctional tag flow prediction is made by an anchor station 66 associated with a target region 56 on the basis of a progression over time of the determined numbers, flows, and/or densities of multifunctional tags 12, 22. The multifunctional tag flow analysis can comprise trends of streams of visitors over time (for example, daily, weekly, yearly). The multifunctional tag flow analysis can be configured for the purpose of determining the appeal of a certain target region 56, in particular in conjunction with an event which is currently taking place there. The multifunctional tag flow prediction can advantageously be used to identify overcrowding or the like at an early stage. It is possible, for example, to identify at an early stage when a particularly large number of people are moving to an individual target region 56 at the same time. Countermeasures can advantageously be taken as a result, for example by adapting the capacities of the target region 56 (for example by opening up blocked-off regions in the target region 56 or sending additional staff to the target region 56) or by directing a stream of visitors away from the target region 56 (for example by displaying on the multifunctional tag 12 that the target region 56 is or will become overcrowded or by promoting other target regions 56).

In at least one method step 54, a respective determined number, a respective determined flow, and/or a respective determined density is associated with the different target regions 56, arranged apart from one another, within the area 58. In at least one method step 60, based on the determined number, the determined flows, and/or the determined density for at least one target region 56, a target region parameter, for example a waiting time, a capacity utilization, a visitor trend, etc. is determined. The target region parameter is in particular displayed to the wearers 102 of the multifunctional tag 12, 22. When determining the target region parameter, predictions which are made to a certain extent from the current flows can be taken into account for changes to the target region parameter. If, for example, in the amusement park 112 a ride is displayed to all wearers 102 of multifunctional tags 12, 22 as being temporarily less busy, a large number of wearers 102 of multifunctional tags 12, 22 go to this ride so that it may be that, when they arrive at the ride, its capacity has already changed significantly. To counteract this, it can be taken into account when displaying the target region parameter for a wearer 102 of a multifunctional tag 12 how many wearers 102 of further multifunctional tags 22 are already on their way to the ride, as measured by the registered movement data of all the multifunctional tags 12, 22, and when the wearer 102 of the multifunctional tag 12 would arrive there. This can be shown, for example, with a two-part display which comprises the current target region parameter (for example, the current waiting time) and the estimated target region parameter on arrival. The target region parameter can of course also comprise other parameters, for example a kind of "level display" of a target region ("The dolphinarium is already 30% full", "There are still 47 free seats for the magic show", etc.) or an estimated arrival time ("With the current number of people, you should arrive at the lion enclosure 2:13 minutes before feeding time") etc.

In at least one method step 62, a proposal is made for a route to follow 64 which is optimized with regard to the determined target region parameter (see, for example, top middle inset in FIG. 3). In the method step 62, the route to follow 64 is displayed to the wearer 102 of the respective multifunctional tag 12.

A schematic flow diagram of a further method which can be performed with the system 36 is shown in FIG. 11. In at least one method step 128, multifunctional tags 12, 22 are activated and associated with respective wearers 102. The multifunctional tags 12, 22 are here fastened to the bodies or to the clothing of the wearers 102. In at least one method step 130, at least one anchor station 66 is associated with an object, for example an advertising display 120. UWB signals 74 and related ultrasonic signals 84 and electromagnetic high-frequency signals 88 are emitted by the activated multifunctional tags 12, 22. The anchor station 66 receives the UWB signals 74 and the related ultrasonic signals 84 and electromagnetic high-frequency signals 88 of the multifunctional tags 22. The directions and/or the distances of the multifunctional tags 22 are in each case determined from the (omnidirectionally) received UWB signals 74. Whether the object is situated within the cone of vision 100 of a multifunctional tag 12, 22 is determined from the travel time difference between the received related ultrasonic signals 84 and electromagnetic high-frequency signals 88. If this is the case, it is assumed by the anchor station 66 that the wearer 102 of this multifunctional tag 12, 22 is viewing the object. In at least one method step 70, an attention parameter of the object by the wearer 102 of the multifunctional tag 12, 22 relative to the object associated with the anchor station 66 is determined. The attention parameter takes the form of a viewing time. In at least one method step 132, a transaction is triggered depending on the determined attention parameter. The transaction is triggered when the attention parameter exceeds a threshold. The transaction can comprise a transaction of data (further information, advertising material, etc.) and/or a monetary transaction, for example in fiat currency or cryptocurrency. In the case of a monetary transaction, the transaction is performed directly between the anchor station 66 and the respective multifunctional tag 12, 22 and/or between the anchor station 66 and a cyber-wallet and/or crypto wallet associated with the respective multifunctional tag 12, 22.

Alternatively or additionally, it is conceivable that in an area 58 in each case at least one anchor station 66 is associated with a plurality of target regions 56, for example attractions, stages, etc., and that in at least one method step 134 it is determined pro rata via the registering of the multifunctional tags 12 by the respective anchor stations 66 how much time a wearer 102 of a multifunctional tag 12 has dedicated to each of the target regions 56. In at least one further method step 136, pro rata invoices, drawn up proportionally, are issued for the respective operator of the respective target regions 56 to the wearer 102 of the multifunctional tag 12. It is also conceivable that, in the method step 136, a digital currency transfer corresponding to the determined attention parameter, for example a cryptocurrency transfer, preferably (because of the potentially low sums) in a cryptocurrency with transaction costs which are as low as possible, such as IOTA, is triggered immediately after determining/establishing the attention parameter (for example, immediately after the visitor has turned their attention to another attraction/performance). Alternatively or additionally, it is also conceivable that a sum (minimum sum) is (or has to be) charged to credit account/crypto wallet linked to the multifunctional tag 12 before entering the area 58, and that a) when leaving the area 58, the sum is paid to the operators of the target regions 56/the artists performing in the target regions 56 pro rata and depending on the attention parameters determined for different target regions 56, that b) after each change of target region 56, a payment, corresponding to the length of time spent at the target region 56, is transmitted to the operator of the target region 56/the artist performing in the target region 56, or c) small payment sums are transmitted continuously during the visit to the target region 56. The continuously transmitted payment sums can vary within the target region depending on a temporary location which can preferably be determined by the interaction between anchor stations 66 and multifunctional tags 12, 22. For example, the payment sum per unit time can be higher if the wearer 102 of the multifunctional tag 12 is situated in a front row of a concert or a show than if the wearer 102 of the multifunctional tag 12 is situated in a back row of the concert or the show or in an adjoining region such as at a bar or in a restroom, etc. In the alternative example of an amusement park, the continuously transmitted payment sum could be higher when a person is situated on a ride and lower when a person is situated in a wait line or in a food outlet.

In order to implement the described method, for each multifunctional tag 12, 22 a) it is determined whether the multifunctional tag 12, 22 is present in the target region 56 (corresponds here to the determination of the attention parameter), b) the location of the multifunctional tag 12, 22 within the target region 56 is determined by a distance and direction determination with respect to at least one anchor station 66, c) a current location-dependent price is obtained, for example from a price list, and d) payments, preferably micropayments (for example in IOTA) every second or every minute to the anchor station 66 or to one or more payment addresses made available by the anchor station 66 (for example, a crypto wallet or crypto wallets of the performing artist or artists and/or a crypto wallet of the event organizer, etc.). Micropayments are preferably here effected continuously to a plurality of separate accounts of all parties involved in the implementation. In the case of a concert, this would be in each case separate accounts (crypto wallets) of each of the performing artists, as well as technicians, security staff, event organizers, etc. It is, for example, also conceivable that, in an area 58 with a plurality of target regions 56, the prices at any one time are dependent on the current number of visitors to the respective target regions 56. Target regions 56 which currently have fewer visitors could here be lower-priced, whereas target regions 56 which currently have a lot of visitors are expensive. As a result, it is advantageously possible to create an incentive for the visitors to distribute themselves evenly in the area 58. In addition, it is conceivable that, for example in the case of an event in which more artists are performing, a sum of money (a tip) is sent directly to a specific artist or several specific artists taking part in the event by actuating a button/touch display of the multifunctional tag 12, 22. This is similar to a hat which is passed around, this not being possible at large events. For example, in this case a multifunctional tag 12, 22 with a public identifier (i.e. an identifiable ID/DID) to which each visitor to the event, i.e. each wearer 102 of a multifunctional tag 12, 22, can send a gift of fiat currency and/or cryptocurrency, can also be assigned to the artist. Preferably, for this purpose the artist also wears a multifunctional tag 12, 22.

Alternatively or additionally, it is conceivable that in a method step 142, a region, which corresponds to the minimum distance 138 between the anchor station 66 and the multifunctional tag 12, is specified around one or several anchor stations 66 and/or around one or several geographical positions. If a multifunctional tag 12 now moves into the region, in a method step 144, data is transmitted to the multifunctional tag 12. In a further method step 146, the data is stored on the multifunctional tag 12 and/or shown directly on the display screen 16. In a further method step 148, periods of time for which multifunctional tags 12 have been present in the region or for which the transmitted data is shown on the display screen 16 of the multifunctional tag 12 are determined by the anchor station 66. In a further method step 150, a digital currency transaction, in particular a cryptocurrency micropayment, for example in IOTA, is transmitted to the multifunctional tag 12 or to an account of the wearer 102 of the multifunctional tag 12.

The invention claimed is:

1. A multifunctional tag with at least two monitoring sensor units, wherein a first monitoring sensor unit of the at least two monitoring sensor units is configured for a purpose of omnidirectional direction determination with respect to at least one further multifunctional tag, and wherein a second monitoring sensor unit of the at least two monitoring sensor units is configured for a purpose of direction-restricted distance determination with respect to the at least one further multifunctional tag,
   wherein one of the at least two monitoring sensor units has an ultra-wideband (UWB) transceiver, comprising a UWB transmitter which is configured for emitting a UWB signal, and comprising a UWB receiver which is configured for receiving a UWB signal emitted by a UWB transmitter of a UWB transceiver of the at least one further multifunctional tag for a distance and direction determination to the at least one further multifunctional tag in a vicinity and at long range,
   wherein another one of the at least two monitoring sensor units has an electromagnetic (EM) transceiver for high-frequency electromagnetic waves, comprising a high frequency (HF) transmitter which is configured for emitting an electromagnetic high-frequency signal, and comprising an HF receiver which is configured for receiving an electromagnetic high-frequency signal emitted by an HF transmitter of an EM transceiver of the at least one further multifunctional tag, and
   wherein, for a respective individual multifunctional tag of the multifunctional tag and the at least one further multifunctional tag, an identifier signal with identity information of the respective individual multifunctional tag is transmitted together with the electromagnetic high-frequency signal, allowing the respective individual multifunctional tag emitting the identifier signal to be identified at least by the at least one further multifunctional tag.

2. The multifunctional tag as claimed in claim 1, further comprising an inertial measurement unit.

3. The multifunctional tag as claimed in claim 1, further comprising an integrated display screen which is configured to show data and/or evaluations from at least one sensor of the multifunctional tag.

4. The multifunctional tag as claimed in claim 3, wherein the integrated display screen covers at least a large portion of a surface of a side of the multifunctional tag on which the integrated display screen is arranged.

5. The multifunctional tag as claimed in claim 1, further comprising a fastening device which is configured to fasten the multifunctional tag on a mobile object or on a living being.

6. The multifunctional tag as claimed in claim 1, further comprising a casing externally bordering the multifunctional tag and with external dimensions which are smaller than 10 cm×10 cm×3 cm.

7. The multifunctional tag as claimed in claim 1, further comprising a casing externally bordering the multifunctional tag and designed so that it is free of plug connections.

8. The multifunctional tag as claimed in claim 1, further comprising a wireless energy supply interface.

9. The multifunctional tag as claimed in claim 1, further comprising a wireless communication interface.

10. The multifunctional tag as claimed in claim 9, further comprising a wireless energy supply interface, wherein the wireless communication interface and the wireless energy supply interface are designed integrally with each other, wherein data transmission at the wireless communication interface and energy transmission at the wireless energy supply interface take place via a same magnetic alternating field.

11. The multifunctional tag as claimed in claim 9, wherein the wireless communication interface comprises a wireless payment interface, a radio key interface, and/or a wireless identification interface.

12. The multifunctional tag as claimed in claim 1, further comprising a vibration signal transmitter.

13. The multifunctional tag as claimed in claim 1, further comprising a concealment sensor which is configured to detect concealment of a display screen of the multifunctional tag and/or of the second monitoring sensor unit.

14. A system with a plurality of the multifunctional tags as claimed in claim 1, wherein the plurality of the multifunctional tags interact with one another and are associated in each case with different mobile objects and/or living beings.

15. The system as claimed in claim 14, further comprising at least one immovably mounted anchor station comprising at least the first monitoring sensor unit which is configured for a purpose of omnidirectional distance and direction determination with respect to at least one multifunctional tag of the plurality of the multifunctional tags.

16. The system as claimed in claim 15, wherein at least one anchor station is designed as a charging tray for multifunctional tags.

17. A method implemented in a system with a plurality of multifunctional tags, which interact with one another and are associated in each case with different mobile objects and/or living beings,
wherein each multifunctional tag of the plurality of multifunctional tags has at least one first monitoring sensor unit and at least one second monitoring sensor unit,
wherein the at least one first monitoring sensor unit is configured for a purpose of omnidirectional direction determination with respect to at least one further multifunctional tag,
wherein the at least one second monitoring sensor unit is configured for a purpose of direction-restricted distance determination with respect to at least one further multifunctional tag,
the method comprising:
in at least one method step, generating a distance warning signal when a distance which is determined between two multifunctional tags of the plurality of multifunctional tags falls below a predeterminable minimum distance and/or when the distance exceeds a predeterminable maximum distance.

18. The method as claimed in claim 17, wherein the distance warning signal comprises a directional display which shows in which spatial direction the distance has fallen below the predeterminable minimum distance and/or has exceeded the predeterminable maximum distance.

19. The method as claimed in claim 17, wherein generation of the distance warning signal and/or a type of the distance warning signal depends on whether, when it is recorded that the distance has fallen below the predeterminable minimum distance, a direct barrier-free contact is detected or whether a barrier-protected contact is detected.

20. The method as claimed in claim 17, further comprising detecting a moving away of mobile objects and/or living beings by monitoring the predeterminable maximum distance.

21. The method as claimed in claim 20, further comprising at least one method step of making a proposal of a direction and/or route to follow to find an object and/or living being of the mobile objects and/or living beings and displaying the proposal to a wearer of a multifunctional tag.

22. A method implemented in a system comprising a plurality of multifunctional tags, which interact with one another and are associated in each case with different mobile objects and/or living beings,
wherein each multifunctional tag of the plurality of multifunctional tags has at least one first monitoring sensor unit and at least one second monitoring sensor unit,
wherein the at least one first monitoring sensor unit is configured for a purpose of omnidirectional direction determination with respect to at least one further multifunctional tag,
wherein the at least one second monitoring sensor unit is configured for a purpose of direction-restricted distance determination with respect to at least one further multifunctional tag,
the method comprising:
in at least one method step, determining a number of active multifunctional tags within the system, a density distribution of active multifunctional tags within the system and/or flows of active multifunctional tags within the system, wherein a respective determined number, a respective determined flow, and/or a respective determined density distribution are associated with different target regions, arranged apart from one another, within an area, and
in at least one method step, determining, based on the determined number, the determined flows, and/or the determined density distribution for at least one target region of the different target regions, a target region parameter and displaying the determined target region parameter to a wearer of a multifunctional tag of the plurality of multifunctional tags,
or
in at least one method step, making a multifunctional tag flow analysis and/or a multifunctional tag flow prediction by an anchor station associated with a target region of the different target regions on a basis of a progression over time of the determined numbers, flows, and/or densities of multifunctional tags.

23. The method as claimed in claim 22, further comprising at least one method step of making a proposal for a route to follow which is optimized with regard to the determined target region parameter and displaying the proposal to the wearer of the multifunctional tag.

24. A method implemented in a system with a plurality of multifunctional tags, which interact with one another and are associated in each case with different mobile objects and/or living beings,
wherein each multifunctional tag of the plurality of multifunctional tags has at least one first monitoring sensor unit and at least one second monitoring sensor unit,
wherein the at least one first monitoring sensor unit is configured for a purpose of omnidirectional direction determination with respect to at least one further multifunctional tag,
wherein the at least one second monitoring sensor unit is configured for a purpose of direction-restricted distance determination with respect to at least one further multifunctional tag,
the method comprising:
in at least one method step, determining an attention parameter, which is a viewing time, of a wearer of a multifunctional tag of the plurality of multifunctional tags relative to an object associated with an anchor station of the system, and triggering a transaction depending on the determined attention parameter exceeding a threshold.

25. The method as claimed in claim 24, further comprising making the transaction which is triggered directly between the anchor station and the multifunctional tag and/or between the anchor station and cyberwallets and/or crypto wallets associated in each case with the multifunctional tag.

26. A method implemented in a system with a plurality of multifunctional tags, which interact with one another and are associated in each case with different mobile objects and/or living beings, wherein each multifunctional tag of the plurality of multifunctional tags has at least one first monitoring sensor unit and at least one second monitoring sensor unit, wherein the at least one first monitoring sensor unit is configured for a purpose of omnidirectional direction determination with respect to at least one further multifunctional tag of the plurality of multifunctional tags, wherein the at least one second monitoring sensor unit is configured for a purpose of direction-restricted distance determination with respect to at least one further multifunctional tag, the system having at least one immovably mounted anchor station including at least the at least one first monitoring sensor unit which is configured for a purpose of omnidirectional distance and direction determination with respect to at least one multifunctional tag of the plurality of multifunctional tags, the method comprising:

initiating automatically, in response to a distance falling below a specifiable minimum distance between a multifunctional tag of the plurality of multifunctional tags associated with a wearer and the at least one immovably mounted anchor station or when a geo region which is specified by one or several anchor stations but does not need to include an anchor station itself being entered by the multifunctional tag, a data transfer from the anchor station to the multifunctional tag, such that the data transfer is initiated automatically by the wearer of the multifunctional tag.

27. The method as claimed in claim 26, further comprising showing automatically the data transmitted in the automatically initiated data transfer on a display screen of the multifunctional tag.

* * * * *